United States Patent [19]
Yamano et al.

[11] Patent Number: 6,067,116
[45] Date of Patent: May 23, 2000

[54] DIGITAL CAMERA

[75] Inventors: Tooru Yamano; Takashi Shimamura, both of Tokyo; Yasushi Yamamoto, Kanagawa, all of Japan

[73] Assignee: Ricoh Company, Ltd., Tokyo, Japan

[21] Appl. No.: 08/938,960

[22] Filed: Sep. 26, 1997

[30] Foreign Application Priority Data

Sep. 27, 1996 [JP] Japan ..................................... 8-257146
Sep. 11, 1997 [JP] Japan ..................................... 9-246333

[51] Int. Cl.[7] ................................................. H04N 5/225
[52] U.S. Cl. ........................... 348/372; 348/375; 348/373
[58] Field of Search ................................... 348/333, 373, 348/375, 376, 372, 14, 552; 345/168, 169, 207, 173, 156, 901, 903; 346/301, 448

[56] References Cited

U.S. PATENT DOCUMENTS

| | | |
|---|---|---|
| 4,258,387 | 3/1981 | Lemelson et al. ......................... 348/14 |
| 5,051,765 | 9/1991 | Yoshizaki et al. ....................... 396/448 |
| 5,274,410 | 12/1993 | Kuwada et al. ......................... 396/448 |
| 5,313,305 | 5/1994 | Harigaya et al. ........................ 348/372 |
| 5,412,425 | 5/1995 | Nagano .................................. 348/372 |
| 5,438,359 | 8/1995 | Aoki ....................................... 348/375 |
| 5,644,516 | 7/1997 | Podwalny et al. ...................... 345/901 |
| 5,710,576 | 1/1998 | Nishiyama et al. .................... 345/169 |
| 5,719,799 | 2/1998 | Isashi ..................................... 348/552 |
| 5,797,047 | 8/1998 | Ando et al. ............................. 396/448 |

Primary Examiner—Wendy Garber
Assistant Examiner—Luong Nguyen
Attorney, Agent, or Firm—Oblon, Spivak, McClelland, Maier & Neustadt, P.C.

[57] ABSTRACT

A digital camera having an upper cover functioning as a cover for the monitor and also attached to the basic body of the camera so that it can freely be opened or closed, and exposing or incorporating the monitor by opening or closing the upper cover, in which an upper cover state detector detects whether the upper cover is opened or closed, and a controller controls power supply to the basic body of the camera and/or to monitor according to a result of the detection by the upper cover state detector.

6 Claims, 19 Drawing Sheets

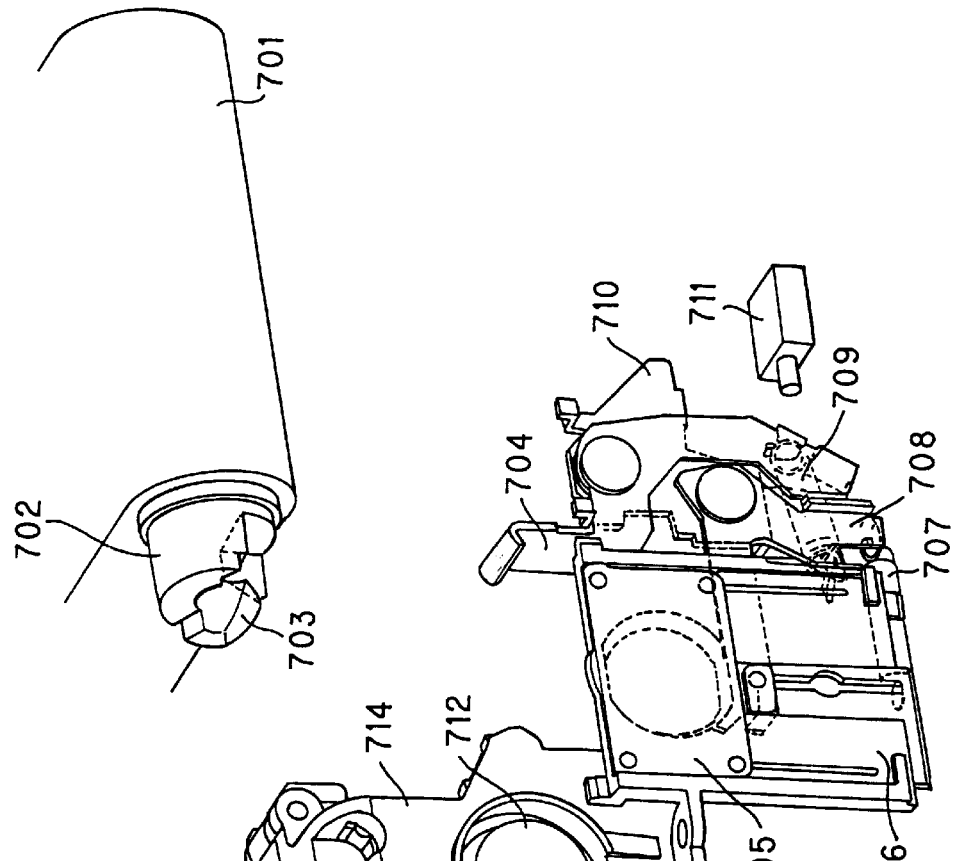
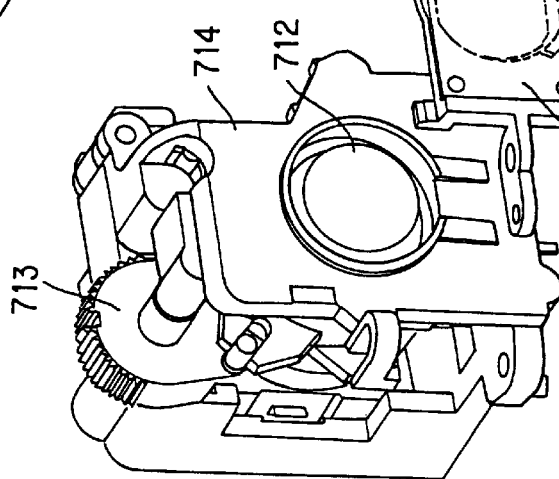

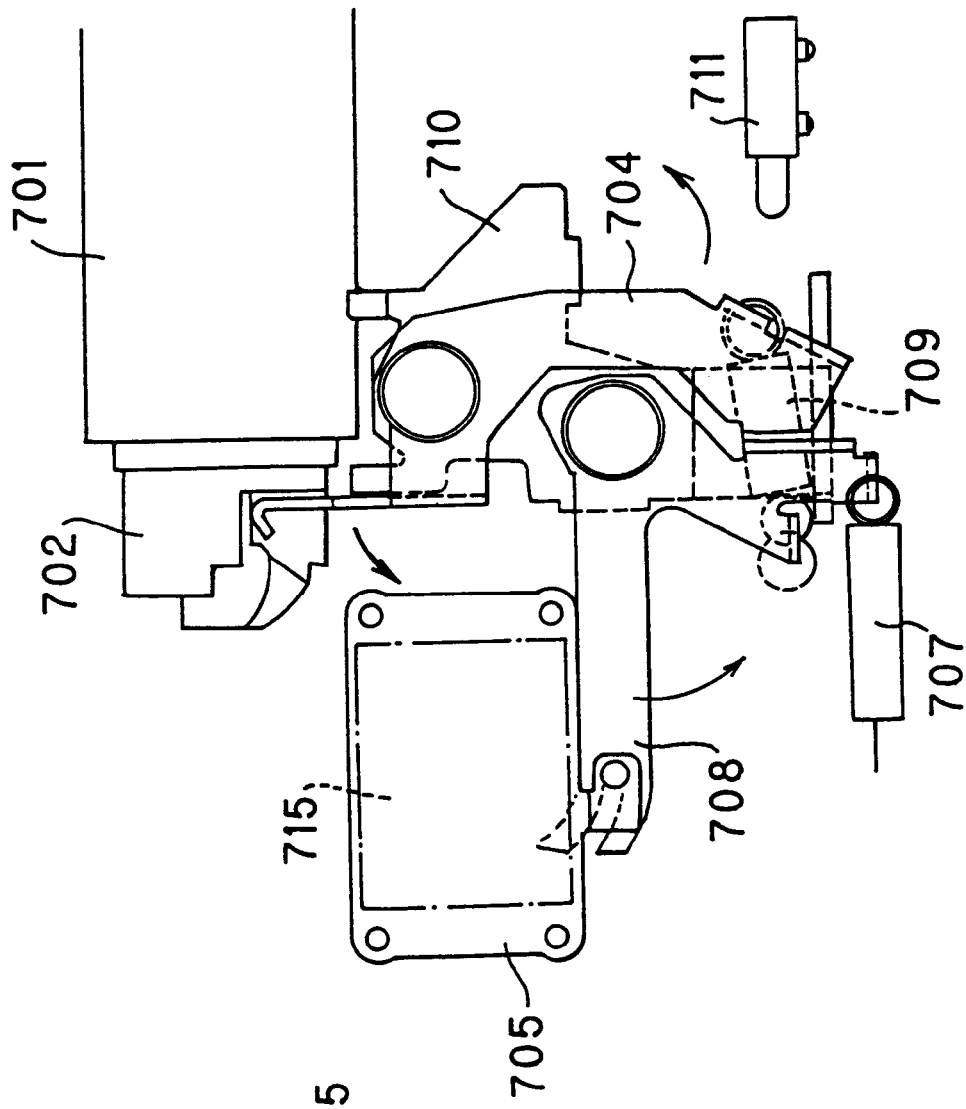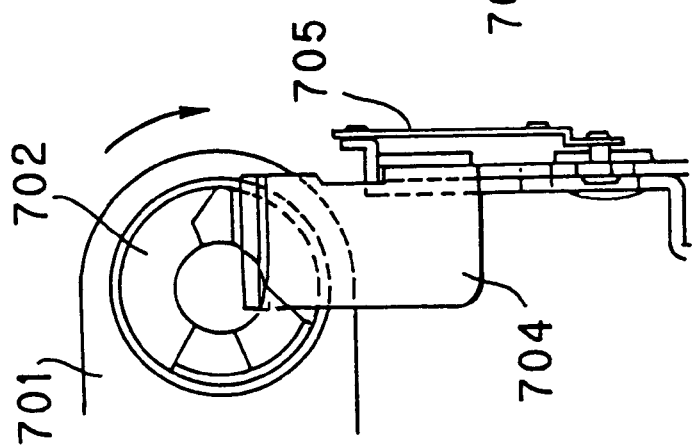

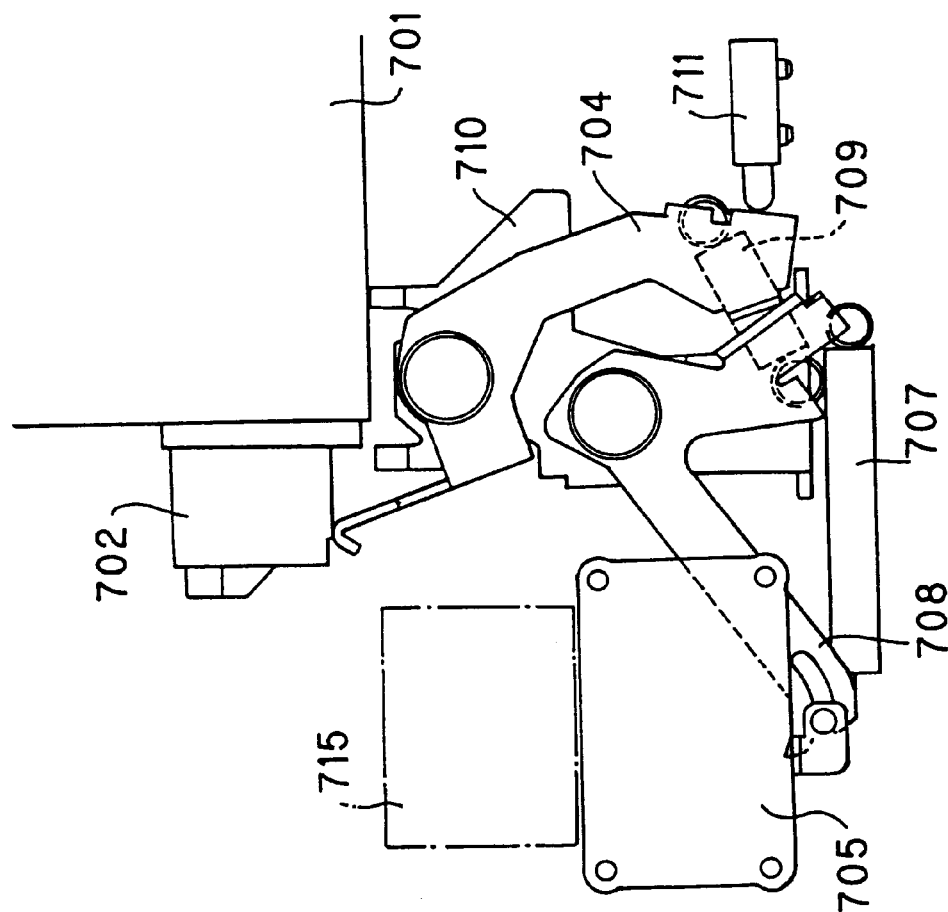
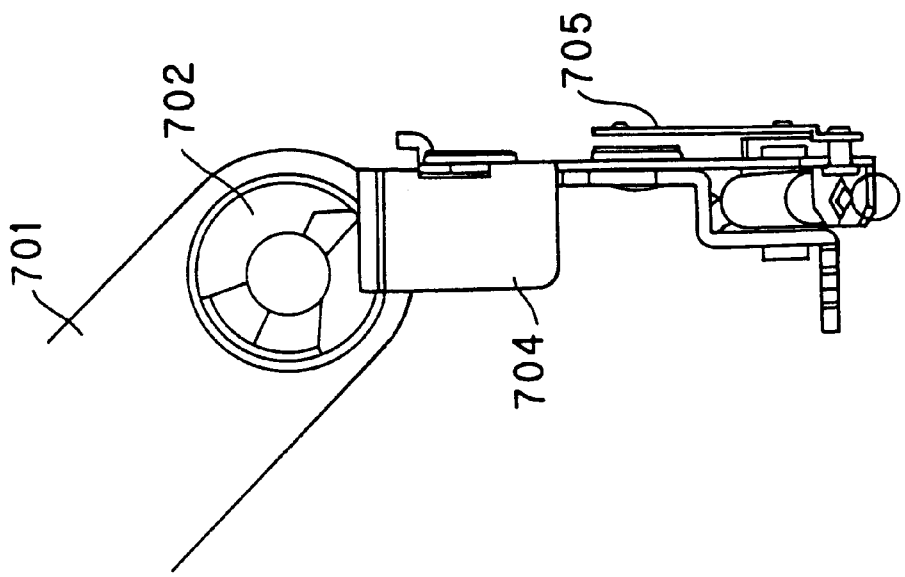
FIG.11B
FIG.11A

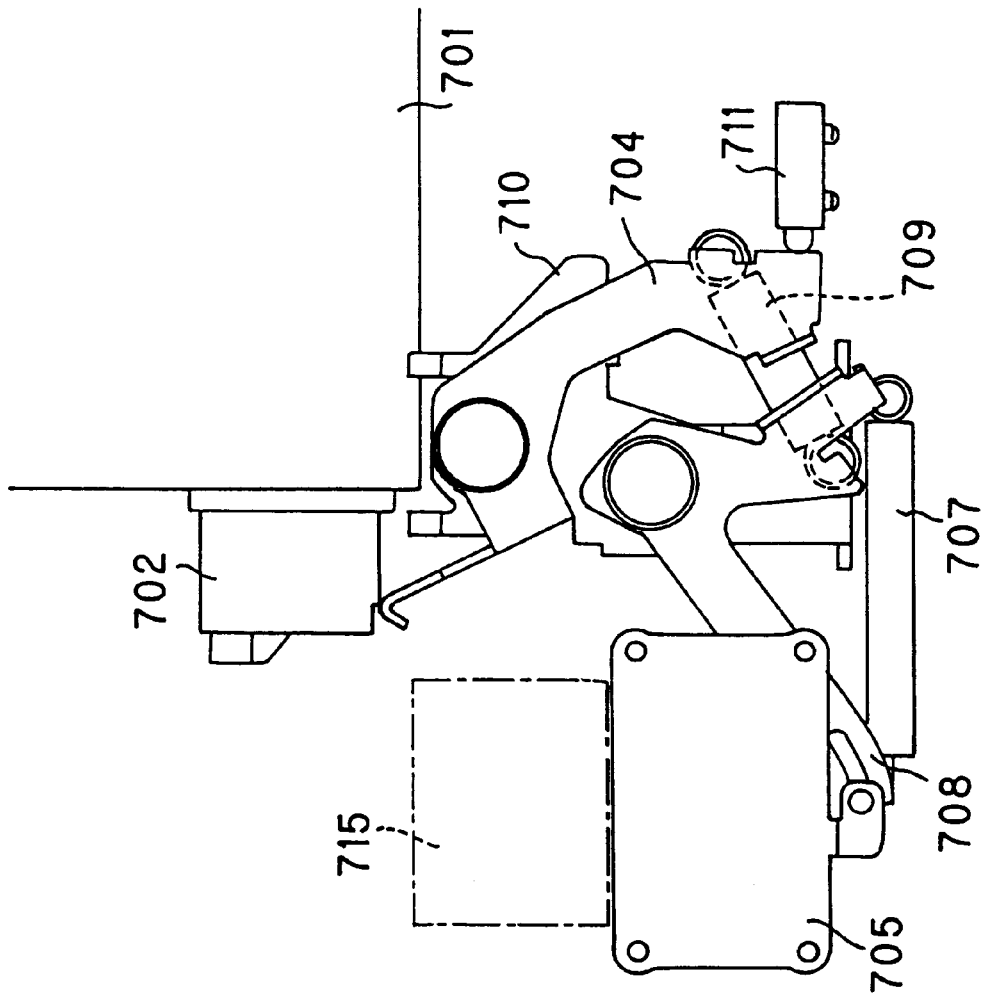
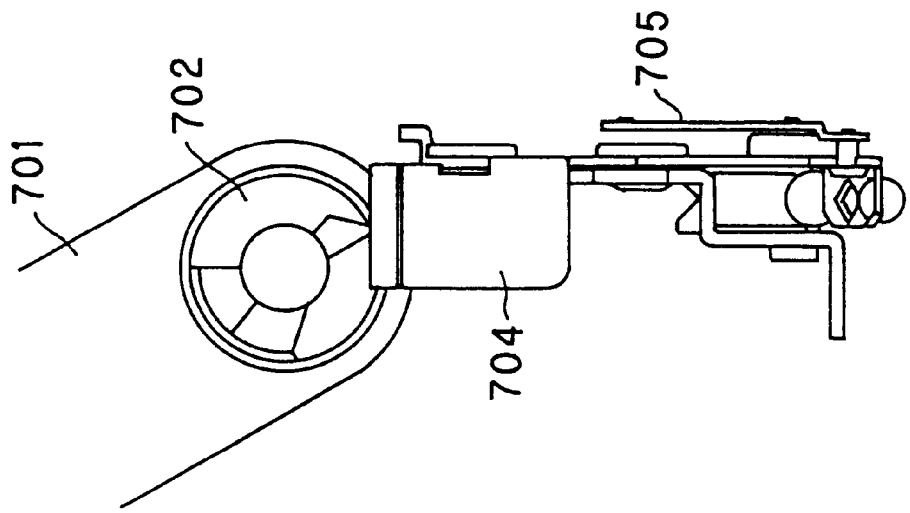

DIGITAL CAMERA

FIELD OF THE INVENTION

The present invention relates to a digital camera with an upper cover, which can freely be opened or closed, attached to a basic body of the camera and a monitor buried in the upper cover, and more specifically to a low power consumption digital camera which allows reduction of the number of required switches, improvement in operability, reduction of imaging mistakes, and elimination of useless power consumption by correlating opening/closing movement of the upper cover to opening/closing movement of a lens barrier, power ON/OFF control, as well as to resetting of various types of mechanism.

BACKGROUND OF THE INVENTION

Recently in the field of digital cameras, those with an upper cover, which can freely be opened or closed, born on a basic body of the camera and also a monitor such as an LCD buried in the upper cover have been introduced into the market and popularized among users.

In relation to electronic equipment such as digital cameras having the construction as described above, for instance, Japanese Patent Laid-Open Publication No. HEI 7-23259 discloses the "Electronic Camera" which incorporates a monitor, detects whether the upper cover has been opened or closed, and changes contents of a display on the monitor according to a result of the detection. In this case, a power switch is provided on a side surface of a basic body of the camera.

Also Japanese Patent Laid-Open Publication No. HEI 8-139981 discloses the "Video Camera" which is a video camera having a monitor with the upper cover capable of being freely opened or closed, and in which the monitor is rotated and stopped at a position where an operator can easily check the display when replaying image information.

By the way, in a portable type of electronic equipment such as a digital camera, generally a battery is used as a power supply source, and it is essential to suppress power consumption of the electronic equipment in applications requiring long time use of the equipment:.

However, in the conventional technology, a power switch is provided on the side surface of the basic body of a camera or on the upper cover and generally provides ON/OFF control to the power supply source according to an intentional operation by a user, so that power may wastefully be consumed because of user's careless mistakes such as forgetting to turn OFF the power supply source or the like.

Also in the conventional technology, when the mechanism such as manual macro is selected for image pickup, the mechanism is kept switched on until the next image pickup is operated unless the user resets the manual macro, so that the user images without realizing the state of the mechanism, which causes imaging mistakes to occur.

SUMMARY OF THE INVENTION

It is an object of the present invention to provide a digital camera, with an upper cover attached to a basic body of the camera so that it can freely be opened or closed as well as with a monitor buried in the upper cover, which allows reduction of the number of required switches and improvement in operability by correlating opening/closing movement of the upper cover to ON/OFF control of a power supply source.

It is another object of the present invention to provide a digital camera, with an upper cover attached to a basic body of the camera so that it can freely be opened or closed as well as with a monitor buried in the upper cover, which allows reduction of the number of required switches, improvement in operability, and reduction of imaging mistakes by correlating opening/closing movement of the upper cover to opening/closing movement of a lens barrier, ON/OFF control of a power supply source, as well as to resetting of various types of mechanisms.

It is another object of the present invention to provide a low power consumption digital camera which accurately detects whether the upper cover is opened or closed and ON/OFF control is provided to the power supply source so that power is not uselessly consumed when a user forgets to turn OFF the power supply source and to close the upper cover, or when the upper cover is accidentally opened.

With the digital camera according to the present invention, in the digital camera having an upper cover functioning as a cover for the monitor and also attached to a basic body of the camera so that it can freely be opened or closed, and exposing or incorporating the monitor by opening or closing the upper cover, an upper cover state detector detects whether the upper cover has been opened or closed, a controller controls power supply to the basic body of the camera and/or to the monitor according to a result of detection by the upper cover state detector, and opening or closing movement of the upper cover is correlated to ON/OFF control of power supply source, which allows reduction of a required switch for ON/OFF control of power supply source, improvement in operability by reducing operational sequences, and elimination of useless power consumption due to user's careless mistakes such as forgetting to turn OFF the power supply source, and for this reason it is possible to provide a low power consumption digital camera.

With the digital camera according to the present invention, the digital camera comprises an imaging device for imaging an object and outputting the image information, a monitor for displaying the image information for the imaged object or other information, and an upper cover functioning as a cover for the monitor and also attached to a basic body of the camera so that it can freely be opened or closed, and exposes or incorporates the monitor by opening or closing the upper cover, and also comprises a correlatedly opening/closing unit having a opening/closing mechanism for turning ON/OFF power supply to the basic body of the camera and monitor in correlation to opening or closing movement of the upper cover, so that it is possible to provide a digital camera which can reduce a required switch, improve operability, and reduce imaging mistakes by correlating opening or closing movement of the upper cover to ON/OFF control of power supply source.

With the digital camera according to the present invention, the digital camera comprises an imaging device for imaging an object and outputting the image information, a monitor for displaying the image information for the imaged object or other information, and an upper cover functioning as a cover for the monitor and also attached to a basic body of the camera so that it can freely be opened or closed, and exposes or incorporates the monitor by opening or closing the upper cover, and also comprises a correlatedly opening/closing unit having an opening/closing mechanism to operate opening/closing movement of a lens barrier and turning ON/OFF of power supply to the basic body of the camera as well as to the monitor in correlation to the opening or closing movement of the upper cover, so that it is possible to provide a digital camera which can reduce a required switch, improve operability, and reduce imaging mistakes by correlating opening or closing movement of the upper cover to the opening or closing movement of the lens barrier and ON/OFF control of power supply.

Other objects and features of this invention will become understood from the following description with reference to the accompanying drawings.

BRIEF DESCRIPTION OF THE DRAWINGS

FIGS. 8A and 8B are views showing opening/closing movement of the lens barrier, turning ON/OFF of a main switch, and a manual macro mechanism in correlation to opening or closing movement of an LCD monitor according to Embodiment 2;

FIGS. 10A and 10B are explanatory views showing a state of the lens barrier and of the main switch when the LCD cover according to Embodiment 2 is closed (namely, an angle of rotation: 0°);

FIGS. 11A and 11B are explanatory views showing state of the lens barrier and of the main switch when the LCD cover according to Embodiment 2 is opened at an angle of 45° (namely, an angle of rotation: 45°);

FIGS. 12A and 12B are explanatory views showing state of the lens barrier and of the main switch when the LCD cover according to Embodiment 2 is opened at an angle of 60° (namely, an angle of rotation: 60°);

DESCRIPTION OF THE PREFERRED EMBODIMENTS

Detailed description is made hereinafter for the digital camera according to the present invention in the order of "Embodiment 1", and "Embodiment 2" with reference to the attached drawings.

Figure 1:
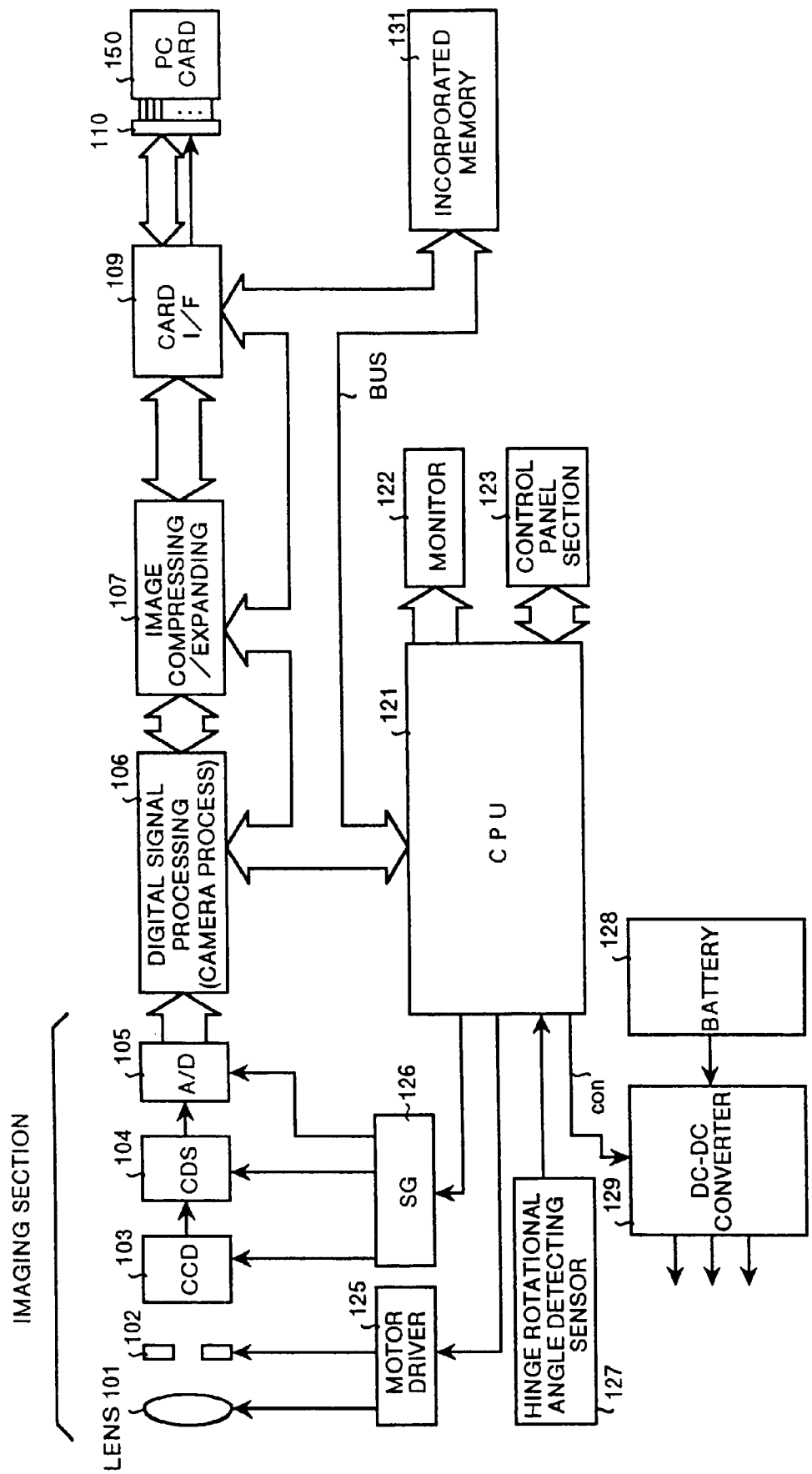
FIG. 1 is a block diagram showing a digital camera according to Embodiment 1 of the present invention.

FIG. 1 is a block diagram showing a digital camera according to Embodiment 1 of the present invention. In the figure, the digital camera according to Embodiment 1 comprises a lens 101, a mechanism 102 including an automatic focus or the like, a CCD 103, a CDS circuit 104, an A/D converter 105, a digital signal processing section 106, an image compressing/expanding section 107, a card interface 109, a PC card interface 110, a CPU 121, a monitor 122, a control panel section 123, a motor driver 125, a SG (control signal generating) section 126, a hinge rotational angle detecting sensor 127, a buttery 128, a DC-DC converter 129, and an incorporated memory 131.

A lens unit comprises the lens 101 and the mechanism 102 including an automatic focus (AF)/aperture/filter section, and a mechanical shutter of the mechanism 102 executes simultaneous exposure for two fields. The CCD (charge coupled device) 103 converts a picture received through the lens unit to an electric signal (analog image data). The CDS (correlation duplex sampling) circuit 104 is a circuit for reducing noises in the CCD type of imaging element. The A/D converter 105 converts the analog image data received from the CCD 103 though the CDS circuit 104 to digital image data. Namely, an output signal from the CCD 103 is converted to a digital signal at an optimal sampling frequency (e.g. an integral multiple of a subcarrier frequency of an NTSC signal) by the A/D converter 105 through the CDS circuit 104.

The digital signal processing section 106 divides the digital image data received from the A/D converter 105 according to color differences (Cb, Cr) and brightness (Y) and subjects the divided data each to various types of processing and to data processing for correction and image compression/expansion. The image compressing/expanding section 107 executes, for instance, orthogonal transformation which is one of processes of operations for image compression/expansion that follows JPEG, as well as Huffman coding/decoding which is one of processes of operations for image compression/expansion that also follows JPEG.

The incorporated memory 131 is connected to the CPU bus BUS and is realized, for example, by a DRAM, a SRAM, or a flash-memory. Namely, in the incorporated memory 131, image data imaged and subjected to compression processing or image data received through a transmitting section not shown in the figure or the like is stored. The compressed image data stored in the incorporated memory 131 is read out through the card interface 109 and is stored in a storage medium such as the PC card 150 connected to the card interface 109 through the PC card interface 110.

The CPU 121 controls all operations inside the digital camera according to an instruction from the control panel section 123 or an operational instruction from an external device such as a remote control not shown in the figure. Also the control panel section 123 has, as described later (Refer to FIG. 2), various types of switches used for selecting a function, instructing an operation for imaging, and setting some other modes from outside, and especially has a self-timer switch, a release switch to turn ON power supply to the monitor 122 when power supply to the basic body of the camera is ON and that to the monitor 122 is OFF, or a mode select switch.

Power for the camera is received from the battery 128 such as a NiCd, a nickel-metal-hydride, or a Lithium battery to the DC-DC converter 129 to be supplied to the inside of the digital camera. It should be noted that the power supply to the basic body of the camera as well as to the monitor 122 is ON/OFF-controlled discretely according to a control signal "con" from the CPU 121.

The monitor 122 is realized by a LCD, a LED, or LE or the like and is embedded in the upper cover attached to the basic body of the camera so that it can freely be opened or closed. Picked-up digital image data and recorded image data subjected to expansion processing are displayed on the monitor 122, and a state of the digital camera or the like is displayed on a mode displayed section of the screen.

In the configuration shown in FIG. 1, an imaging device is realized by the lens 101, mechanism 102, CCD 103, CDS circuit 104 and A/D converter 105, the upper cover state detector by the hinge rotational angle detecting sensor 127, and the controller by the CPU 121 respectively.

Figure 2:
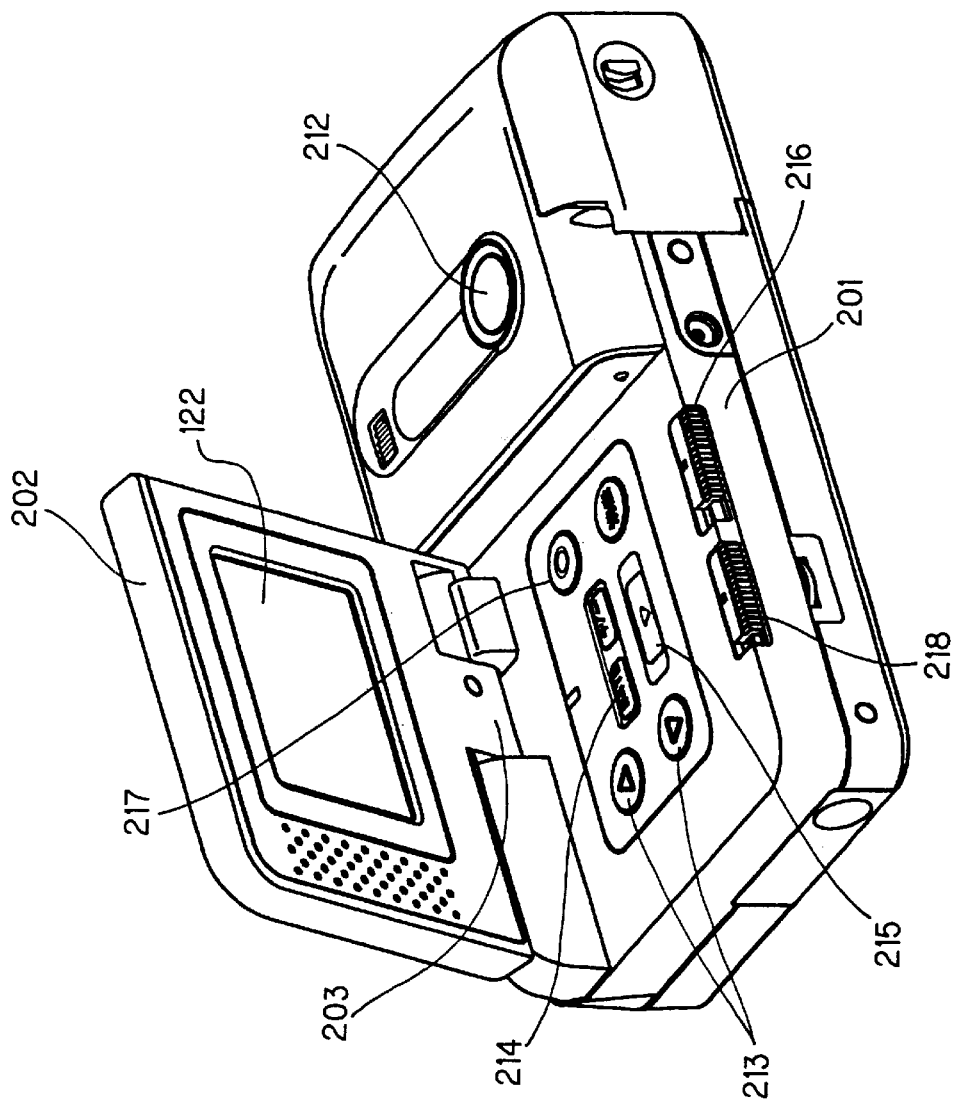
FIG. 2 is a perspective view showing the digital camera according to Embodiment 1.
Figure 3:
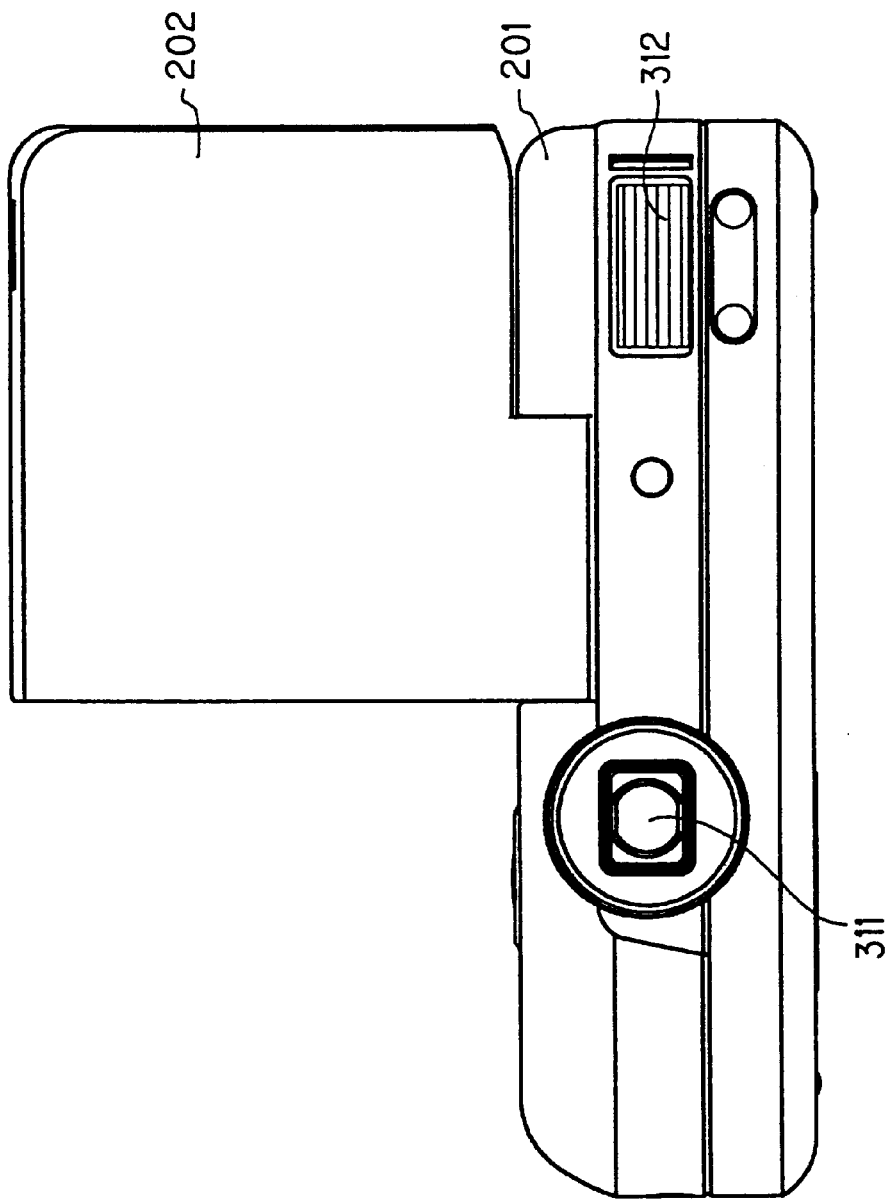
FIG. 3 is a front view showing the digital camera according to Embodiment 1 with the upper cover in the opened state viewed from the front side.

FIG. 2 is a perspective view showing the digital camera according to Embodiment 1, and FIG. 3 is a front view showing the digital camera with the upper cover in the opened state viewed from the front side.

In the figure, designated at the reference numeral 122 is a monitor, at 201 a basic body of a camera, at 202 an upper cover, at 203 a hinge, at 212 a release switch, at 213 a frame-advance switch, at 214 a DATE switch, at 215 a flash switch, at 216 an image-quality mode switch, at 217 a self-timer switch, at 218 a record mode select switch, at 311 an imaging lens, and at 312 a flash. It should be noted that the PC card 150 and the like are omitted to be shown herein to make the description simple.

Figure 4:
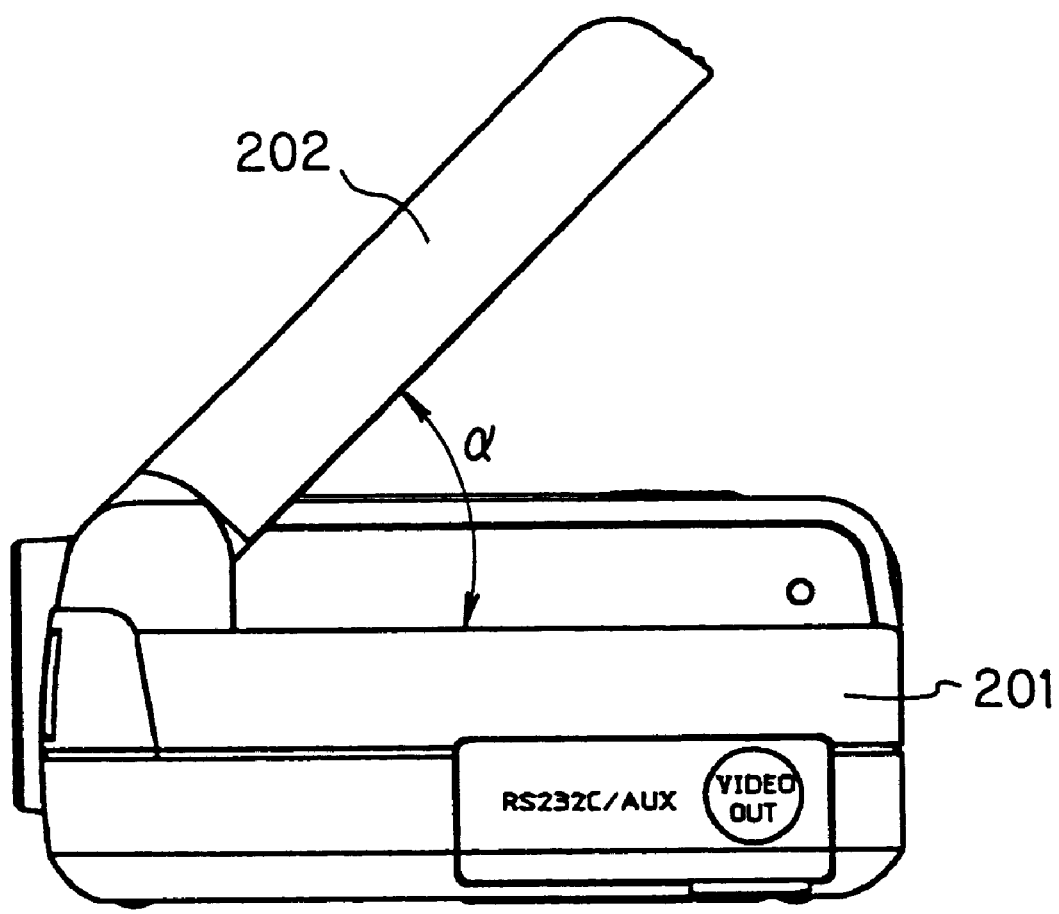
FIG. 4 is a side view showing the digital camera according to Embodiment 1 with the upper cover in the opened state viewed from the side surface.

FIG. 4 is a side view showing the digital camera according to Embodiment 1 with the upper cover in the opened state viewed from the side surface.

In the figure, the reference character α indicates an opening angle which is a hinge rotational angle of the upper cover 202. In the digital camera according to Embodiment 1, a rotational angle of the hinge 203 is detected by the hinge rotational angle detecting sensor 127, and when the opening angle α is detected as not less than 45 degrees, power supply to the basic body of the camera 201 and to the monitor 122 are controlled by the CPU 121 so as to be tuned ON.

Namely, in the digital camera according to Embodiment 1, the hinge rotational angle detecting sensor 127 detects whether the upper cover 202 is opened or closed, the CPU 121 controls power supply to the basic body of the camera 201 and to the monitor 122 according to a result of the detection by the hinge rotational angle detecting sensor 127, and the opened/closed state of the upper cover 202 is correlated to ON/OFF control to power supply, which allows reduction of a switch for ON/OFF control for a power supply unit, improvement in operability by reduction of operational sequences, elimination of useless power consumption due to user's careless mistakes such as forgetting to turn OFF the power, and realization of a low power consumption digital camera.

Figure 5:
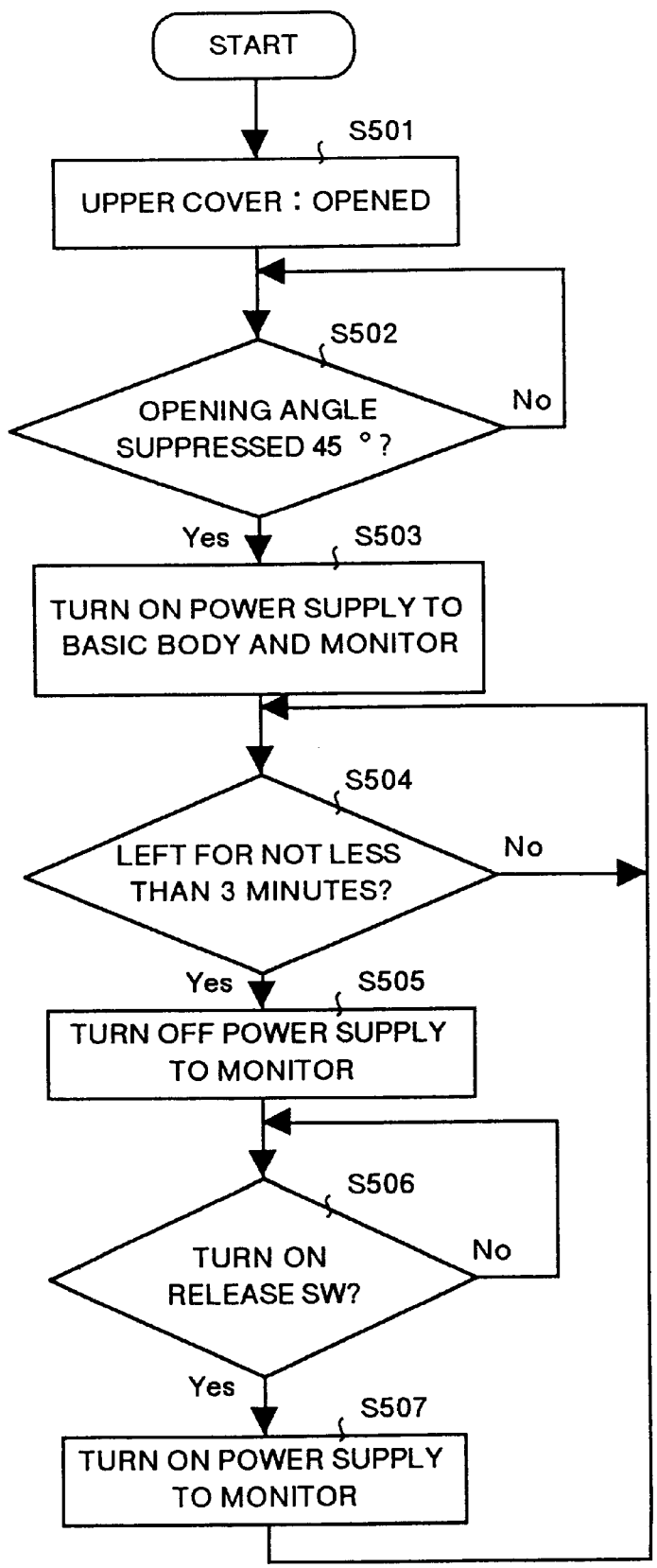
FIG. 5 is a flowchart for explaining control of power supply when the upper cover of the digital camera according to Embodiment 1 is opened.

FIG. 5 is a flowchart for explaining control of power supply when the upper cover 202 of the digital camera according to Embodiment 1 is opened. The description herein assumes that a threshold value of the opening angle α in the hinge rotational angle of the upper cover 202 is 45 degrees when power supply to the basic body of the camera 201 as well as to the monitor 122 is ON/OFF-controlled, and that the utmost time to keep on a standby state for imaging is three minutes.

When power supply to the basic body of the camera 201 as well as to the monitor 122 is OFF, and if the upper cover is opened (step S501), at first in step S502, an opening angle α in the hinge rotational angle of the upper cover 202 is detected by the hinge rotational angle detecting sensor 127.

At this point of time, the CPU 121 keeps the power supply still in the OFF state when the opening angle α is less than 45 degrees, but at the point of time when the opening angle α has surpassed 45 degrees, the CPU 121 turns ON the power supply to the basic body of the camera 201 as well as to the monitor 122 according to the control signal "con" (step S503).

With this operation, the digital camera is ready to image an object (barrier is opened, and a lens position or the like is ready to be set), which allows the digital camera to be operated. In order to keep the digital camera in the standby state, an opening angle α in the hinge rotational angle of the upper cover 202 may be 45 degrees or more, and the monitor 122 may be set at any angle. Namely, the monitor 122 (upper cover 202) can be set according to an angle for imaging.

When power supply to the basic body of the camera 201 is ON, various types of modes and imaging conditions (e.g. an image mode, an image-quality mode, with or without flash or the like) are set, and imaging can be carried out by pressing down the release switch 212. An object to be imaged is displayed on the monitor 122 before imaging, but a picked-up image is displayed thereon after the imaging.

If the conventional type of camera is kept in the standby state for imaging in which those various types of switches are not used for a long period of time, power for display output on the monitor 122 is consumed, so that the power (battery) may disadvantageously be exhausted even though there is only a small number of frames actually imaged.

To prevent unnecessary power consumption, when the digital camera according to Embodiment 1 is left in the standby state for imaging for three minutes (step S504), the camera is designed so as to turn OFF power supply only to the monitor 122 (step S505) for prevention of unnecessary power consumption. It should be noted that the time during the standby state for imaging is counted by a counter in the CPU 121.

Also, after the power supply to the monitor 122 is turned OFF due to passage of the time, if any of the switches, such as the release switch 212 or the (image quality or record) mode select switch 216 or 218 is pressed down (step S506), the power supply to the monitor 122 is turned ON again (step S507).

If the self-timer switch 217 is pressed down during the standby state for imaging, the power supply to the monitor 122 is turned OFF, although it is not shown in the flowchart shown in FIG. 5. That is because, when the self-timer is used for imaging, generally a photographer itself is, in many cases, in the side of an object to be imaged and for this reason, the monitor 122 is not required to be ON in many cases.

Figure 6:
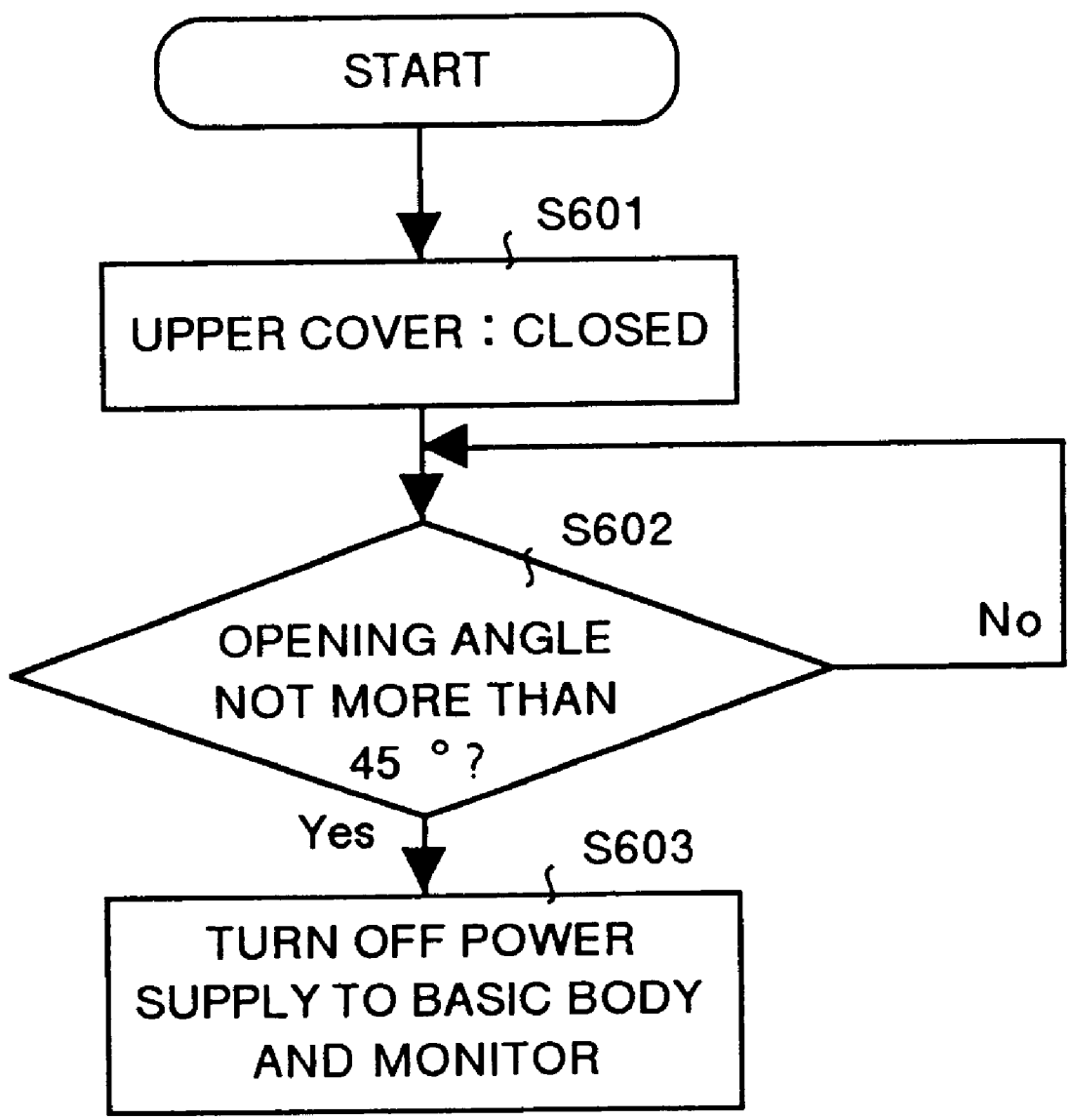
FIG. 6 is a flowchart for explaining power supply control when the upper cover of the digital camera according to Embodiment 1 is closed.

FIG. 6 is a flowchart for explaining control of power supply when the upper cover 202 of the digital camera according to Embodiment 1 is closed.

When the power supply to the basic body of the camera 201 as well as to the monitor 122 is ON, and if the upper cover 202 is closed (step S601), at first in step S602, an opening angle α in the hinge rotational angle of the upper cover 202 is detected by the hinge rotational angle detecting sensor 127.

At this point of time, the CPU 121 keeps the power supply still in the ON state when the opening angle α is not less than 45 degrees, but at the point of time when the opening angle α becomes 45 degrees or less, the CPU 121 turns OFF the power supply to the basic body of the camera 201 as well as to the monitor 122 according to the control signal "con" (step S603).

With this operation, when an opening angle α in the hinge rotational angle of the upper cover 202 is a small angle such as in a case where the upper cover 202 is forgotten to be securely closed or in a case where the upper cover 202 is accidentally opened in a bag or the like during being carried, it is possible to eliminate such disadvantage that power supply to the basic body of the camera 201 as well as to the monitor 122 is turned ON and power may be uselessly consumed.

As described above, with Embodiment 1, in the digital camera having an upper cover 202 functioning as a cover for the monitor 122 and also attached to the basic body of the camera so that it can freely be opened or closed and exposing or incorporating the monitor 122 by opening or closing the upper cover 202, the hinge rotational angle detecting sensor (upper cover state detector) 127 detects whether the upper cover 202 is opened or closed, and the CPU (controller) 121 controls power supply to the basic body of the camera and/or monitor 122 according to a result of the detection by the hinge rotational angle detecting sensor 127, which allows reduction of a switch for ON/OFF control for the battery 128, improvement in operability by reducing operational sequences, elimination of useless power consumption due to user's careless mistakes such as forgetting to turn OFF the power, and realization of a low power consumption digital camera by correlating opening/closing movement of the upper cover 202 to ON/OFF control of the battery (power supply source).

Also, the hinge rotational angle detecting sensor 127 detects an angle indicating how the upper cover 202 is opened or closed, the CPU 121 controls power supply to the basic body of the camera and/or monitor 122 when it is detected by the hinge rotational angle detecting sensor that the angle is not less than or not more than a specified value, so that when the battery 128 is ON/OFF-controlled only by opening or closing the upper cover 202, if the upper cover 202 is forgotten to be closed or the upper cover 202 is accidentally opened in a bag or the like during being carried, it is possible to prevent the power from consumption due to an unexpected ON state of the power supply to the basic body of the camera or to the monitor 122. In other words, in any case where the upper cover 202 is forgotten to be closed or unexpectedly opens, power supply to the basic body of the camera or to the monitor 122 is turned OFF, which allows elimination of useless power consumption and realization of a low power consumption digital camera.

For example, when the conventional type of camera is left in the standby state for imaging for a long period of time, and if power supply to the monitor 122 is ON, the power is consumed in spite of no imaging carried out, and consequently the number of frames available for one operation for imaging is disadvantageously reduced, but in Embodiment 1, when the upper cover 202 is open and is left as it is for a certain period of time, the CPU 121 automatically turns OFF the power supply to the monitor 122, so that power consumption can be reduced.

Also, in Embodiment 1, when the upper cover 202 is open and the self-timer switch (provided on the control panel section 123) is pressed down, the power supply to the monitor 122 is automatically turned OFF. Namely, when the self timer is used for imaging, the photographer is generally in the side of an object to be imaged, and in this case, it is natural that nobody looks at the monitor 122. In this case, useless power consumption can be reduced by turning OFF the power supply to the monitor 122. Turning OFF the power supply thereto is also a notice to the photographer indicating that imaging with the self timer has been started.

With any of the switches provided on the control panel section 123, power supply to the monitor 122 can be turned ON when the CPU 121 keeps the power supply to the basic body of the camera to be ON and keeps the power supply to the monitor 122 to be OFF, in other words, the power supply to the monitor 122 is automatically turned ON again by pressing down any of the various types of switches, which allows control of the power supply to the monitor 122 with higher operability. When the power supply to the monitor 122 is turned OFF because of being left in the ON state of the power supply to the monitor, for example, and if the user wants to turn ON again the power supply to the monitor 122, it is quite troublesome for the user to open or close the upper cover 202 each time, which is not poor in operability, but pressing down the various types of switches allows the power supply to the monitor 122 to be turned ON, which is convenient in use.

In Embodiment 1, as a switch (123) to turn ON power supply to the monitor 122, the release switch 212 (or the mode select switches 216, 218) is used, so that, by using any of those switches used with a high frequency to turn ON power supply to the monitor 122, it is possible to improve operability by using the more practical switch.

A digital camera according to Embodiment 2 comprises a correlatedly opening/closing unit having an opening/closing mechanism for executing opening or closing movement of a lens barrier and turning ON/OFF power supply to the basic body of the camera or monitor in correlation to opening or closing movement of the upper cover.

Detailed description is made hereinafter for configuration and operations of the digital camera according to Embodiment 2 with reference to FIG. 7 to FIG. 19. It should be noted that the basic configuration of the digital camera according to Embodiment 2 is the same as that of the ordinary digital camera, so description is made herein only for some specific points to the present invention.

Figure 7:
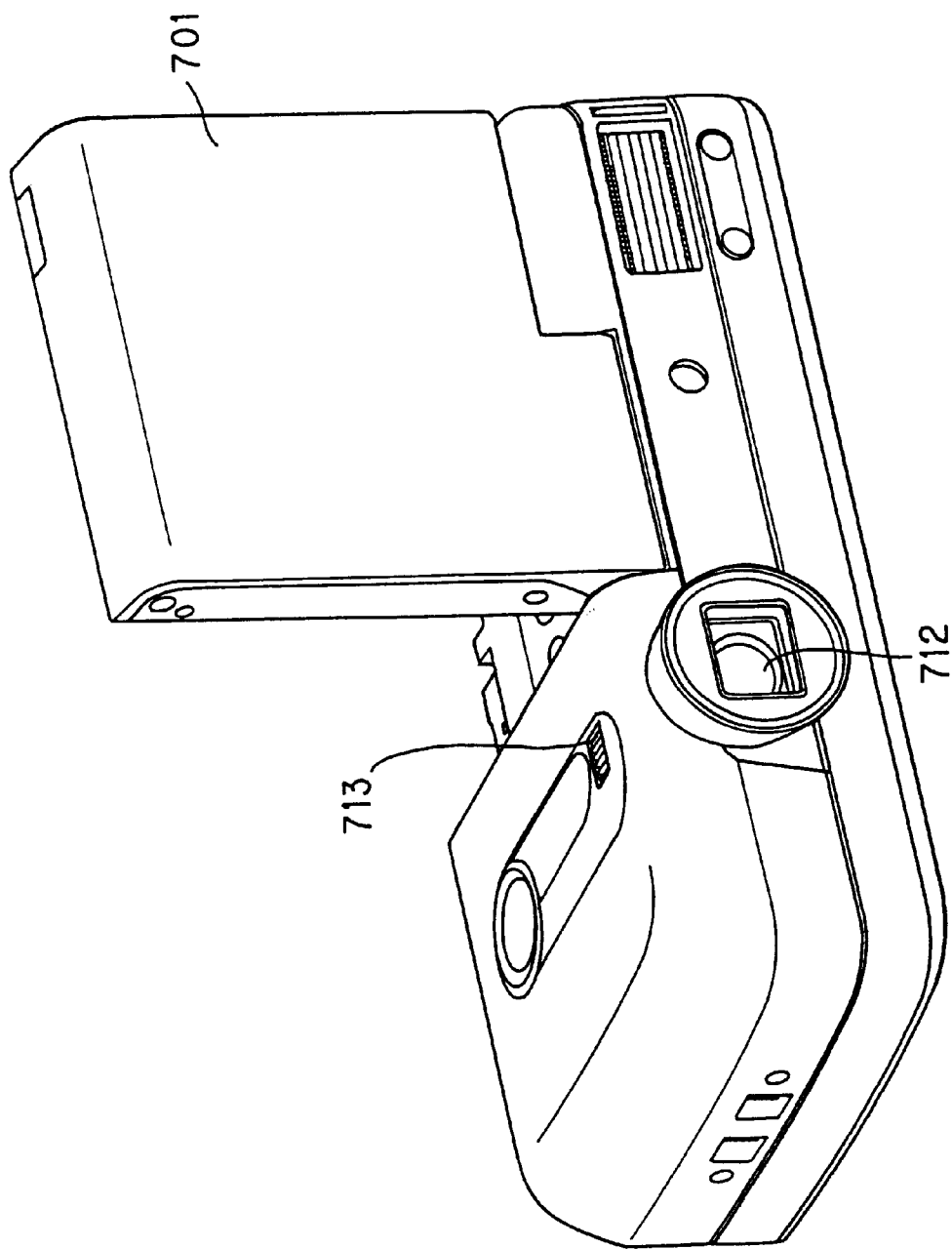
FIG. 7 is a perspective view showing the digital camera according to Embodiment 2.

FIG. 7 is a perspective view showing the digital camera according to Embodiment 2, and FIGS. 8A and 8B are views showing opening/closing movement of the lens barrier in correlation to opening or closing of an LCD monitor according to Embodiment 2, turning ON/OFF of a main switch, and a manual macro mechanism.

In the figures, designated at the reference numeral 701 is an LCD cover which is an upper cover including an LCD monitor (not shown), at 702 a cam for opening/closing movement of the lens barrier and turning ON/OFF the main switch, at 703 a cam for resetting the manual macro mechanism, at 704 and 708 levers each for opening/closing movement of the lens barrier respectively, at 705 the lens barrier, at 706 a frame member for maintaining the lens barrier 705 and conveying the lens barrier along a specified groove, at 707 a spring for closing movement of the lens barrier, at 709 a charge spring for preventing breakage of the lens barrier mechanism, at 710 a frame member for rotatably supporting the levers 704 and 708 each for opening/closing movement of the lens barrier, at 711 the main switch, at 712 a lens-barrel including a imaging lens, at 713 an operating dial for manual macro, and at 714 a frame member for maintaining the lens-barrel 712 and the operating dial 713. It should be noted that the cams 702, 703 are integrally provided in a rotary shaft (not shown) of the LCD cover 701 or provided therein so as to move together with the rotary shaft.

Figure 9:
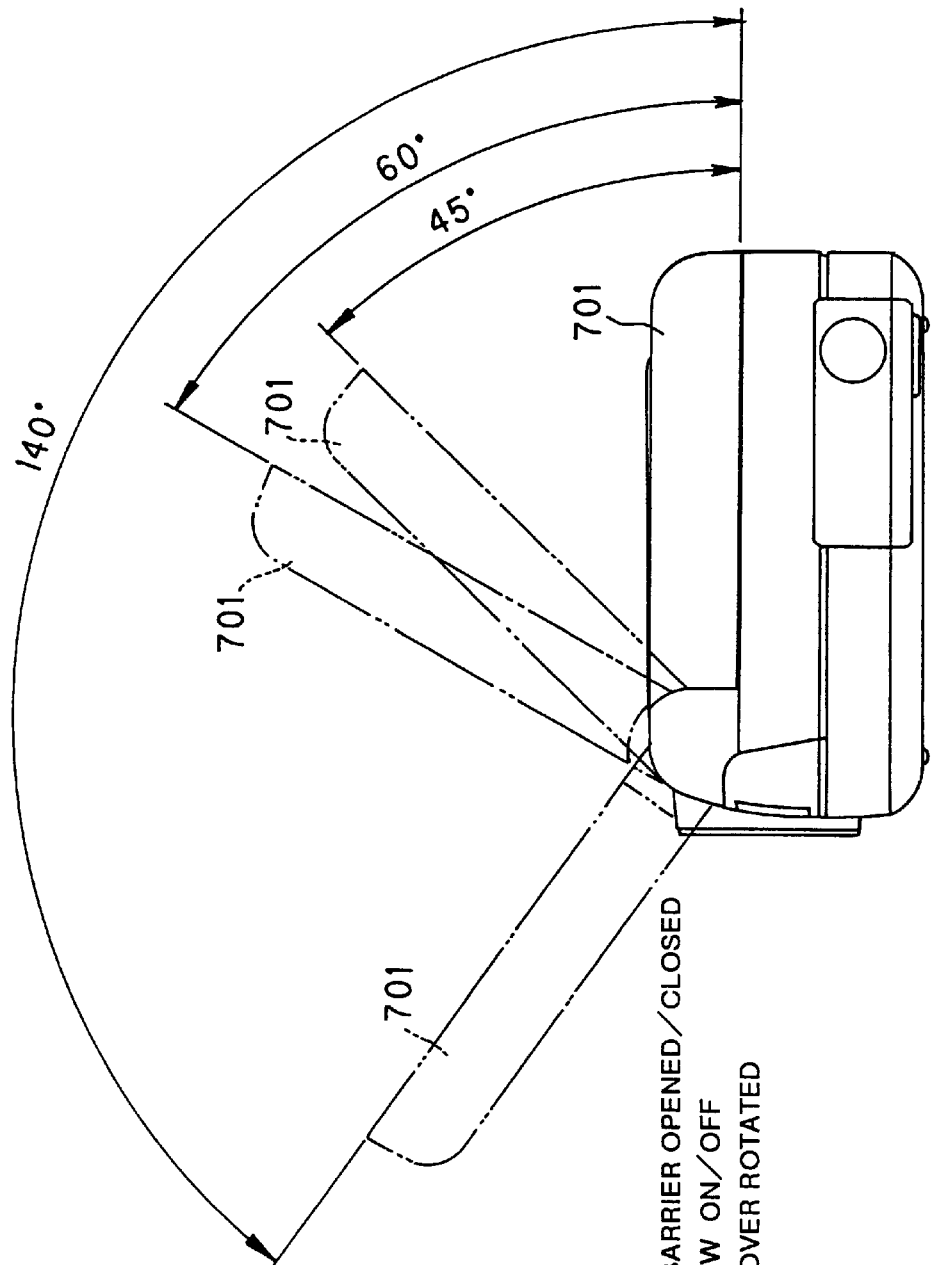
FIG. 9 is an explanatory view showing a relation between each angle of rotation of the LCD monitor (in other words, LCD cover) of the digital camera according to Embodiment 2 and each timing when the lens barrier is opened or closed as well as that when the main switch is turned ON or OFF.

FIG. 9 shows a relation between each angle of rotation of the LCD monitor (in other words, LCD cover 701) of the digital camera according to Embodiment 2 and each timing when the lens barrier is opened or closed and when the main switch is turned ON or OFF, the lens barrier 705 is opened or closed according to any rotational angle of the LCD cover 701 in a range from 0° to 45°, and the main switch 711 is turned ON or OFF with any rotational angle of the LCD cover 701 in a range from 45° to 60°. Also, the LCD cover 701 can be rotated in a range from 0° to 140°.

It should be noted that, although the detailed description is made later, the mechanism shown in FIG. 7 and FIGS. 8A and 8B corresponds to the opening/closing mechanism of the correlatedly opening/closing unit according to the present invention, and actuates opening or closing movement of the lens barrier 705 and operation for turning ON/OFF the main switch (switch for supplying power to the basic body of the camera and the monitor) 711 in correlation to the opening or closing movement (namely rotating movement) of the LCD cover 701.

As clearly understood from FIG. 9, this opening/closing mechanism (correlatedly opening/closing unit) is actuated when the LCD cover 701 is opened, and after the lens barrier is fully opened at any rotational angle in a range from 0° to 45°, main switch 711 is turned ON at any of the rotational angle in a range from 45° to 60°.

Next description is made for opening or closing movement of the lens barrier 705 and ON/OFF operation of the main switch 711 in correlation to opening or closing movement (namely, rotational movement) of the LCD cover 701 with reference to FIGS. 10A and 10B, FIGS. 11A and 11B, and FIGS. 12A and 12B.

FIG. 10A and FIG. 10B are explanatory views each showing a state of the lens barrier 705 and of the main switch 711 when the LCD cover 701 is closed (namely, angle of rotation: 0°), and FIG. 10A shows a side view in the state described above, while FIG. 10B shows a front view in the state respectively. It should be noted that the range by a dot-and-dashed line designated at the reference numeral 715 is an aperture section of the photographing lens.

As shown in the figures, when the LCD cover 701 is closed (namely, the angle of rotation is 0°), the lens barrier 705 is stopped at a position where an aperture section 715 is completely covered thereby. Also, the main switch 711 is in the OFF state (namely, in the state in which the main switch does not contact the lever 704 for opening/closing movement of the lens barrier), which shows the state in which power is not supplied to the basic body of the camera and the LCD monitor.

Each of the levers 704, 708 for opening or closing movement of the lens barrier is rotatably attached to the frame 710 respectively, and one edge of the lever 704 for opening or closing movement of the lens barrier is engaged with an edge of the cam 702 for opening or closing movement of the lens barrier and turning ON/OFF the main switch, and the other edge of the lever 704 is coupled to the lever 708 for opening or closing movement of the lens barrier through the charge spring 709 for preventing breakage of the lens barrier mechanism.

On the other hand, the lever 708 for opening or closing movement of the lens barrier is connected to the lens barrier 705 at one edge of the lever 708, and the charge spring 709 for preventing breakage of the lens barrier mechanism and the spring 707 for closing movement of the lens barrier are attached to the other edge thereof.

When the LCD cover 701 is opened from the state in which the LCD cover 701 is closed (namely, the state in which the angle of rotation is 0°), the cam 702 attached to the rotary shaft of the LCD cover 701 is rotated in the direction indicated by the arrow in the figures, whereby one edge of the lever 704 for opening or closing movement of the lens barrier is pushed out in the direction indicated by the arrow, with which the levers 704, 708 each for opening or closing movement of the lens barrier are rotated and moved in the direction indicated by the arrow.

FIG. 11A and FIG. 11B are explanatory views each showing a state of the lens barrier 705 and of the main switch 711 when the LCD cover 701 is opened at an angle of 45° (namely, an angle of rotation is 45°), and FIG. 11A shows a side view of the states, while FIG. 11B shows a front view of the states respectively. As shown in the figures, when the LCD cover 701 is opened by being rotated by an angle of 45°, the lens barrier 705 is moved to below the aperture section 715 in accordance with the rotation and movement of the cam 702 as well as the levers 704, 708 for opening or closing movement of the lens barrier, whereby the aperture section 715 is completely opened. In this case, one edge of the lever 704 for opening or closing movement of the lens barrier which has bean rotated and moved is stopped by contacting the edge section of the main switch 711 (or is stopped at a position adjacent to the edge section with non-contact). In other words, when the LCD lever 701 is opened at an angle of 45°, the lens barrier 705 is fully opened and an ON operation of the main switch 711 is ready to be started.

It should be noted that the lens barrier 705 moves, as shown in FIGS. 8A and 8B, downward along the groove of the frame 706, and reaches the lowest edge of the groove thereof when having been fully opened, whereby the movement of the barrier further downward is prevented. Also, the spring 707 is pulled by the movement of the lever 708 for opening or closing movement of the lens barrier.

FIG. 12A and FIG. 11B are explanatory views each showing a state of the lens barrier 705 and of the main switch 711 when the LCD cover 701 is opened at an angle of 60° (namely, an angle of rotation: 60°), and FIG. 12A shows a side view of the states, while FIG. 12B shows a front view of the states respectively. As shown in the figures, when the LCD cover 701 is opened by rotating by an angle of 60°, the edge section of the main switch 711 is pressed down by the lever 704 for opening or closing movement of the lens barrier in accordance with the rotation and movement of the cam 702 as well as the levers 704 for opening or closing movement of the lens barrier, whereby the main switch 711 is turned ON. It should be noted that, in this case, as the lever 708 for opening or closing movement of the lens barrier is prevented from being moved downward by the lowest edge of the groove of the frame 706, the charge spring 709 is pulled by the movement of the lever 704 for opening or closing movement of the lens barrier.

Figure 13:
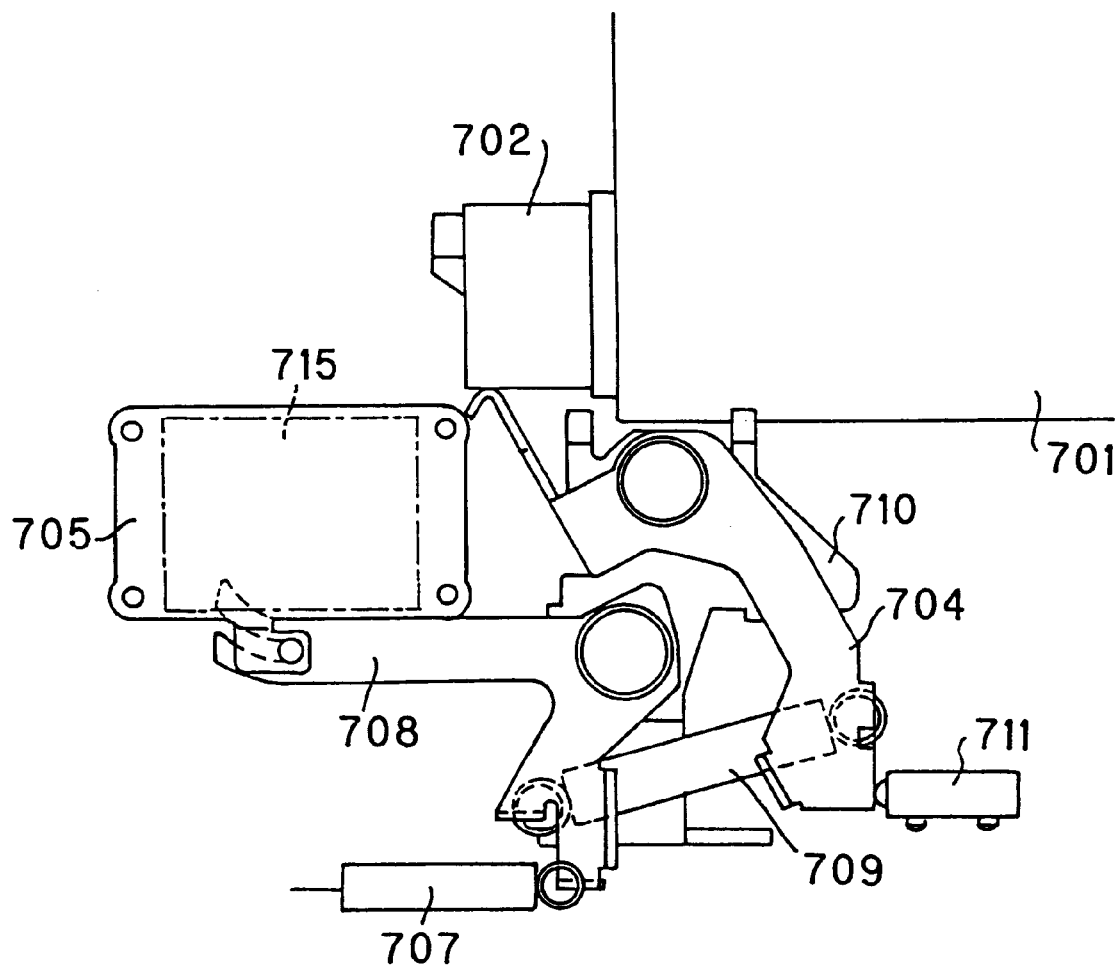
FIG. 13 is an explanatory view showing a state in which the LCD cover is opened with the lens barrier maintained in the closed state in Embodiment 2.

Next description is made for a state when the LCD cover is opened with the lens barrier 705 maintained in the closed state with reference to FIG. 13. It is assumed herein that the lens barrier 705 is fixed in the closed state as in a case where the lens barrier 705 is pressed with a finger in an abnormal operation when the LCD cover 701 is closed (namely, an angle of rotation: 0°) shown in FIGS. 10A and 10B. When the LCD cover 701 is rotated and opened in this state, the lever 704 for opening or closing movement of the lens barrier moves in association with rotation of the cam 702, and the lever 708 for opening or closing movement of the lens barrier is pulled in the direction in which the lens barrier 705 is opened through the charge spring 709. However, as the lens barrier 705 is fixed, the movement of the lever 708 for opening or closing movement of the lens barrier is prevented, so that the moving rate of the lever 704 for opening or closing movement of the lens barrier is absorbed by extension of the charge spring 709.

In other words, even when the movement of the lever 708 for opening or closing movement of the lens barrier is prevented by fixing the lens barrier 705, only the lever 704 for opening or closing movement of the lens barrier can be moved without breaking a coupling state between the levers 704, 708 for opening or closing movement of the lens barrier because of the charge spring 709. Accordingly, as shown in FIG. 13, when the lens barrier 705 is closed and even locked, and even if the LCD cover 701 is tried to be opened, the mechanism of the device will never be broken.

Similarly it is assumed herein that, in the state where the LCD cover 701 is open, the lens barrier 705 is opened and is fixed in any abnormal operation such as pressing down of the lens barrier 705 with a finger. When the LCD cover 701 is rotated and closed in this state, the cam 702 also returns to the initial position as shown in FIGS. 10A and 10B with its rotation. With this operation, the force to move the lever 704 for opening or closing movement of the lens barrier in the direction indicated by the arrow in FIGS. 10A and 10B is lost, so that the lever 704 for opening or closing movement of the lens barrier tries to return to the initial position according to a shrinking force of the charge spring 709. And at the same time, the force loaded to the lever 708 for opening or closing movement of the lens barrier is only the shrinking force of the spring 707 because the charge spring 709 has been shrunk, and for this reason the lever 708 for opening or closing movement of the lens barrier is pulled in the direction in which the lens barrier 705 is closed. However, as the lens barrier 705 has been fixed, the lever 708 for opening or closing movement of the lens barrier is prevented from being moved, so that the LCD cover 701 is closed in a state shown in FIG. 14. In other words, when the lens barrier 705 is opened and even locked, and even if the LCD cover 701 is to be closed, it can be done without breaking the mechanism of the device.

Figure 14:
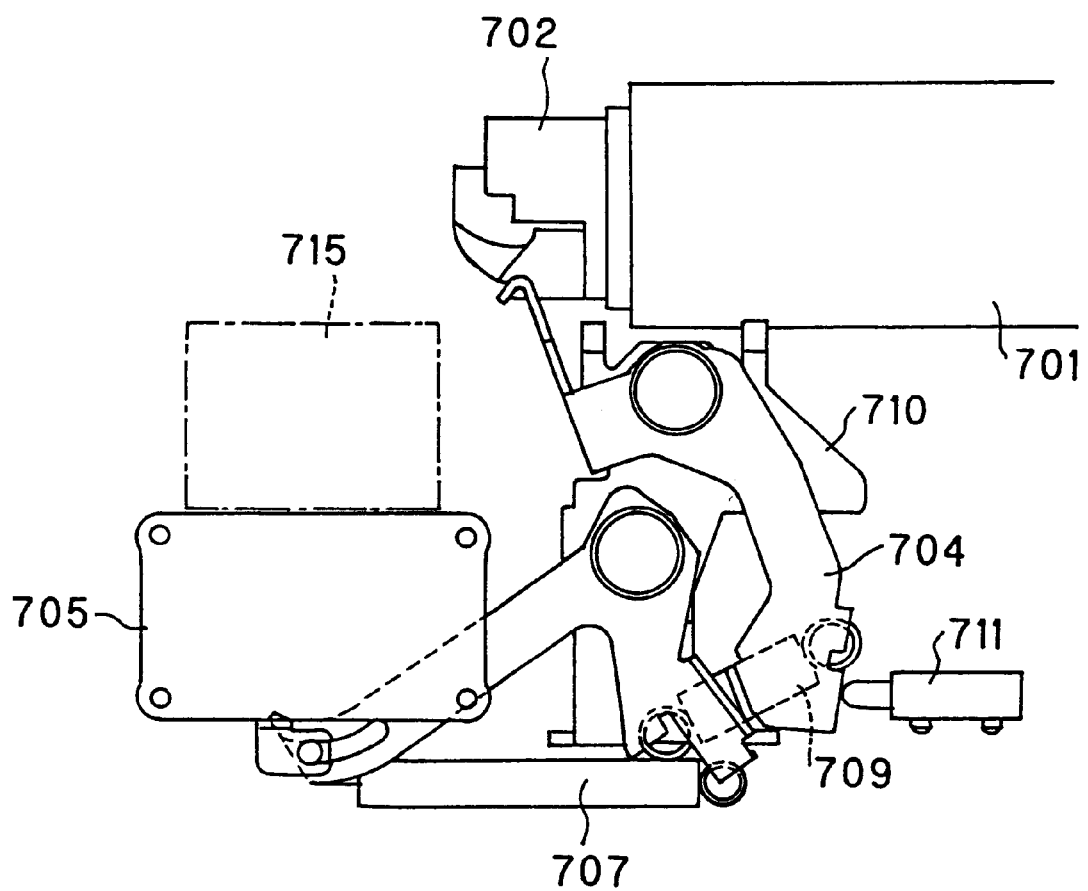
FIG. 14 is an explanatory view showing a state in which the LCD cover is closed with the lens barrier maintained in the opened state in Embodiment 2.

It should be noted that each state of the levers 704, 708 for opening or closing movement of the lens barrier as well as of the main switch 711 when the lens barrier 705 is fully opened and fixed as shown in FIG. 14 is the same as the state when the LCD cover 701 is opened at an angle of 45° (an angle of rotation of 45°) as shown in FIGS. 11A and 11B. In other words, the lever 704 for opening or closing movement of the lens barrier is stopped in the state in which the main switch 711 is released from the ON state (namely an OFF state). Accordingly, even when the lens barrier 705 is opened and locked, the OFF operation of the main switch 711 can be carried out in correlation to closing of the LCD cover 701.

By the way, in Embodiment 2, various types of the operation mode of the mechanism including manual macro are available in the state where the LCD cover 701 has been opened, and a reset mechanism for resetting the operation mode of the mechanism in correlation to closing movement of the LCD cover 701 is provided. The device has a breakage preventing mechanism for maintaining the operation mode of the mechanism in the initial position and also for preventing the reset mechanism from being broken by an external force due to an abnormal operation when the LCD cover 701 has been closed. Similarly the device has also a breakage preventing mechanism for preventing the reset mechanism from being broken because of the closing movement of the LCD cover 701, when closing movement of the LCD cover 701 is carried out while it is opened and the operation mode of the mechanism is kept locked. Also, the manual macro according to Embodiment 2 is based on a dial system (operating dial 713) and can adjust a macro distance within a preset range in a stepless and linear way, and the reset mechanism returns manual macro for the operating dial 713 to the initial position in correlation to closing movement of the LCD cover 701.

Next description is made for the reset mechanism of the manual macro and the breakage preventing mechanism according to Embodiment 2 with reference to FIG. 15 to FIG. 19.

Figure 15:
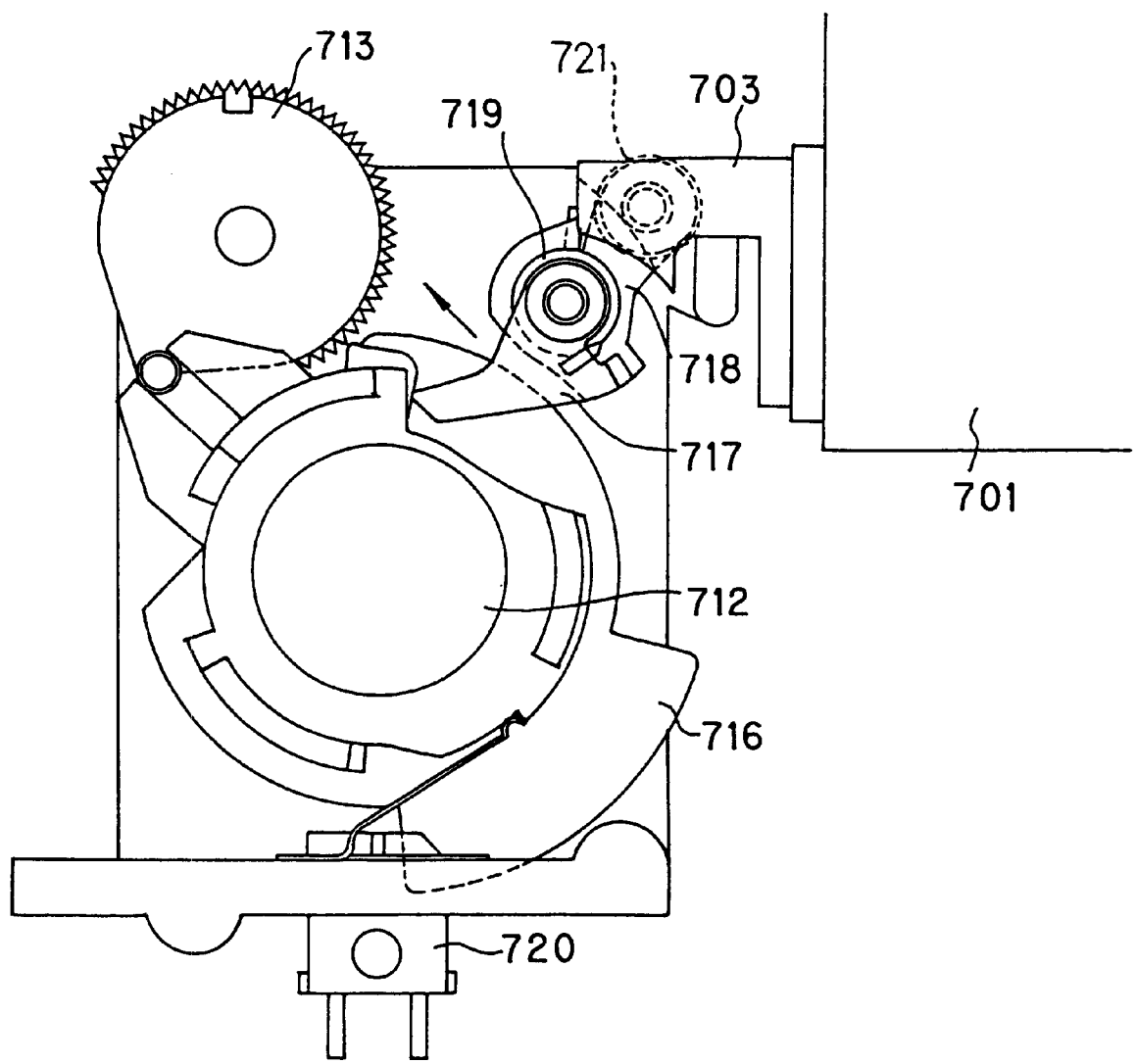
FIG. 15 is an explanatory view showing a state of a lens-barrel including a imaging lens and a manual macro mechanism when the LCD cover is opened and ordinary imaging is performed without using the manual macro in Embodiment 2.
Figure 16:
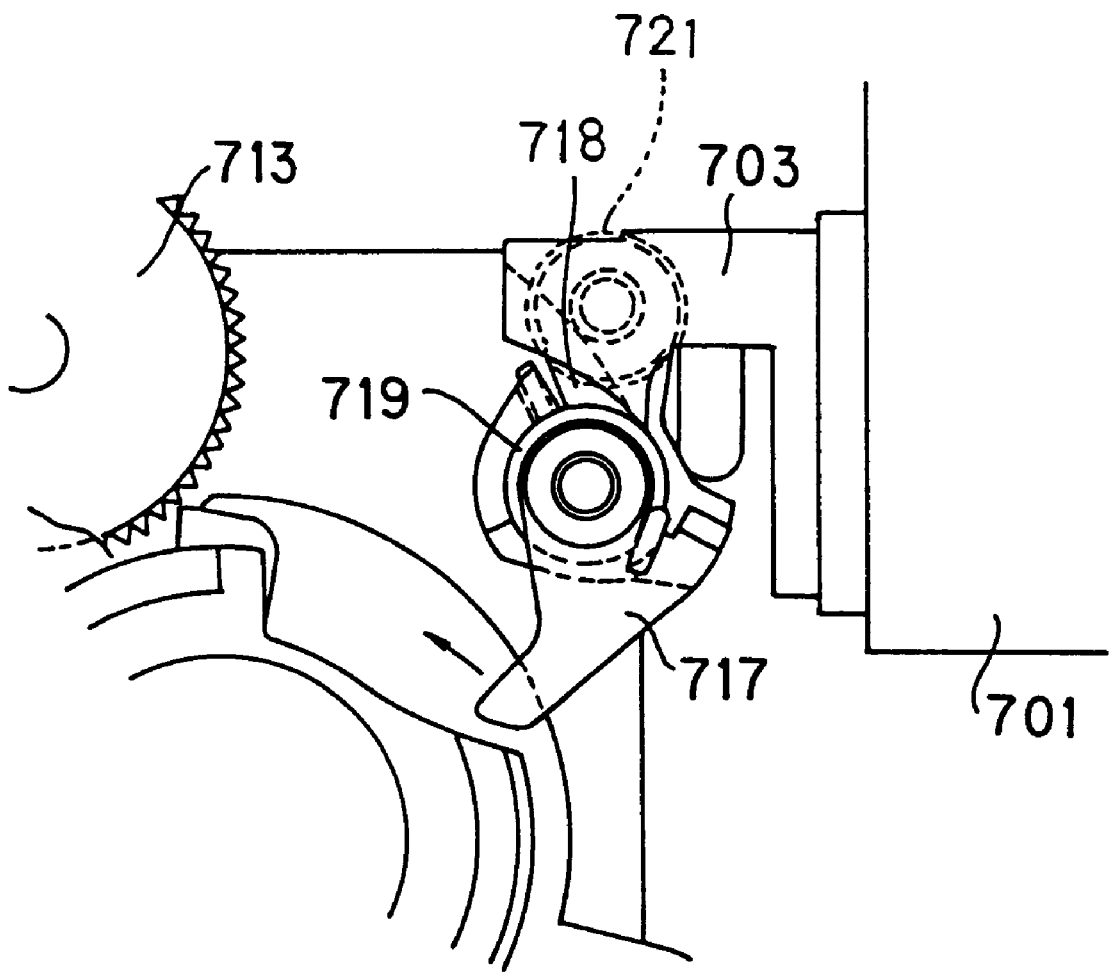
FIG. 16 is an explanatory view showing a state of the lens-barrel including the imaging lens and manual macro mechanism when the LCD cover is opened and ordinary imaging is performed without using the manual macro in Embodiment 2.

FIG. 15 and FIG. 16 are explanatory views each showing a state of a lens-barrel 712 including an imaging lens and a manual macro mechanism when the LCD cover 701 is opened and ordinary imaging is performed without using the manual macro. In the figures, designated at the reference numeral 720 is a sensor for detecting a position of the imaging lens (lens-barrel 712), at 716 a blade for conveying a position of the imaging lens to a position detecting sensor 720, at 717 and 718 a lever for resetting a manual macro mechanism (corresponding to the reset mechanism) respectively, at 719 a charge spring for preventing breakage of the manual macro mechanism (corresponding to the breakage preventing mechanism), and at 721 a charge spring (described by a dotted line in the figure). It should be noted that the levers 717, 718 and the charge spring 719 are integrated and are energized by the charge spring 721 in the direction indicated by the arrow in the figure, and a range shown in FIG. 15 and FIG. 16 can be rotated with a light load. A fixed lens feed-out cam (not shown) is attached to a receiving base of this lens-barrel 712, and macro imaging can be performed by rotating the lens-barrel 712.

Figure 17:
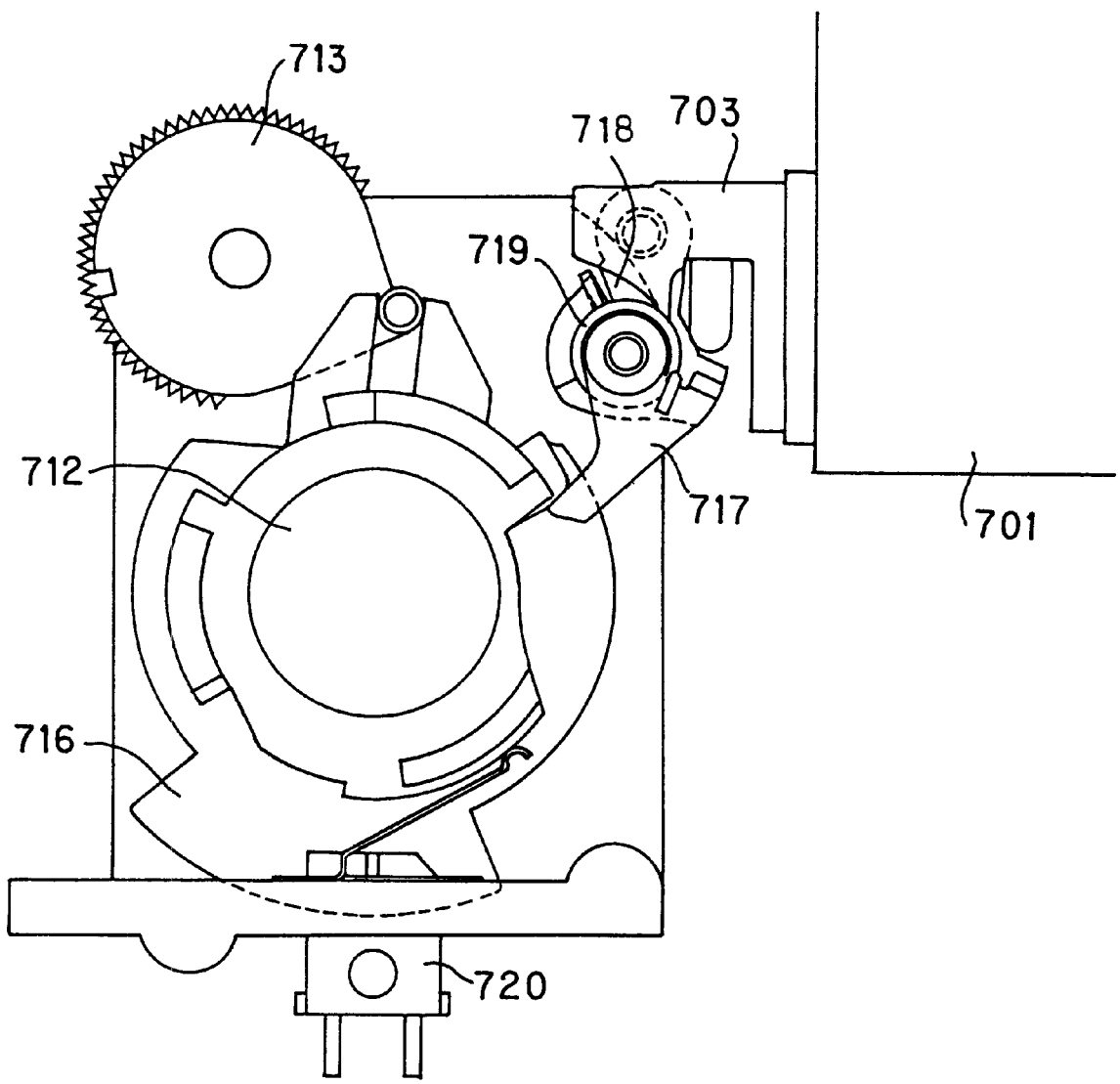
FIG. 17 is an explanatory view showing a state of the lens-barrel when the LCD cover is opened and the manual macro is used in Embodiment 2.

FIG. 17 shows a state of the lens-barrel when the LCD cover 701 is opened and the manual macro is used, and when the operating dial 713 is rotated in association with use of the manual macro, the blade 716 is rotated and moved, and the levers 717, 718 and the charge spring 719 are also moved together. During the movement, the sensor 720 is blocked by the blade 716. With this blockage it can be detected that the mode is a macro mode.

Figure 18A:
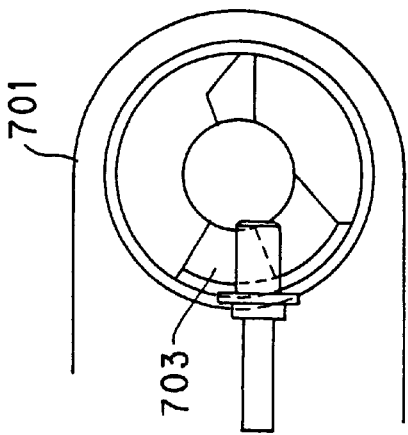
FIGS. 18A and 18B are explanatory views showing state of the lens-barrel when the LCD cover is closed in Embodiment 2.
Figure 18B:
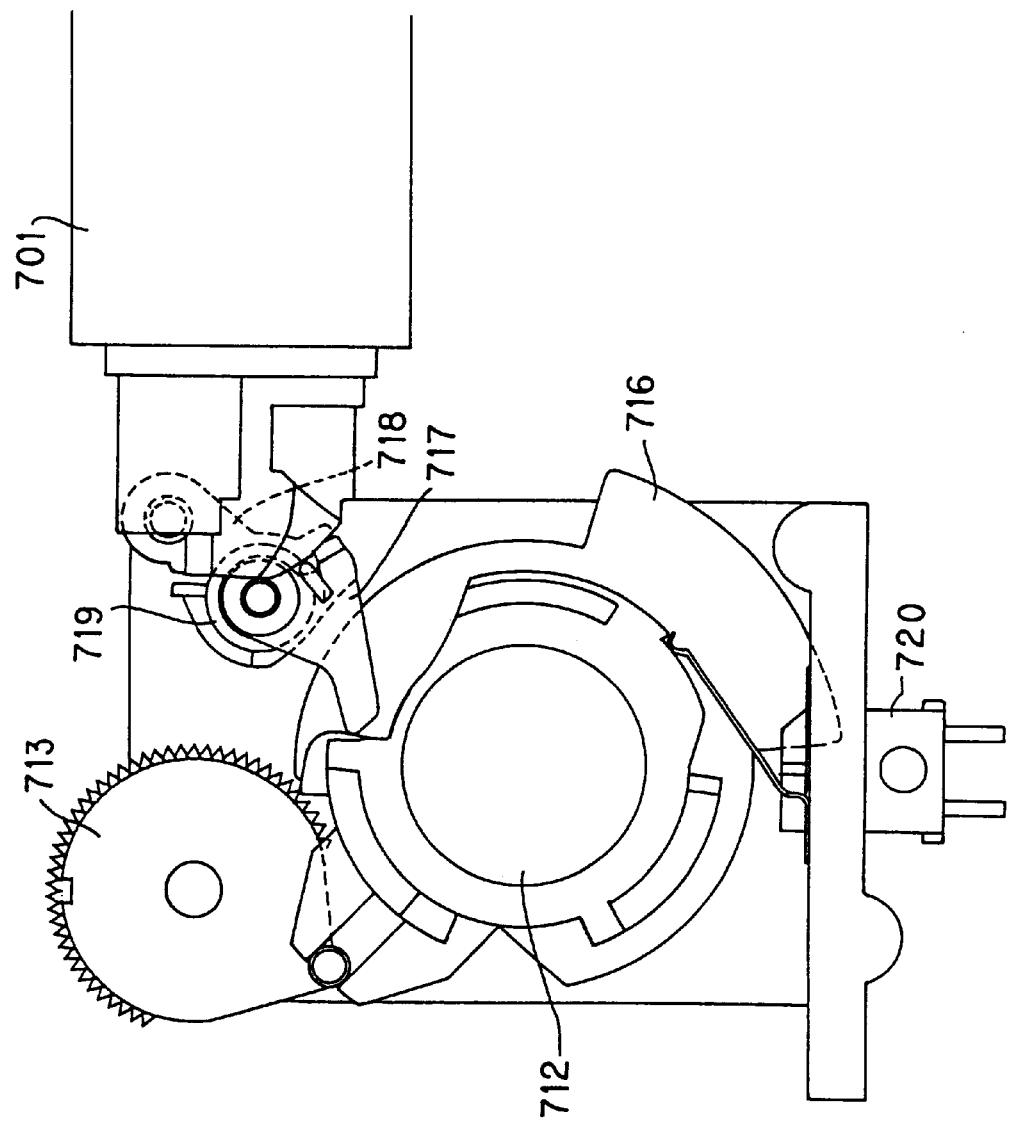

FIGS. 18A and 18B show a state of the lens-barrel 712 when the LCD cover is closed, and the levers 717, 718 and the charge spring 719 are returned together to the initial positions respectively by the cam 703 of the LCD cover 701, and with this movement, the lens-barrel 712 including the imaging lens is also returned to an ordinary imaging position as the initial position.

Figure 19:
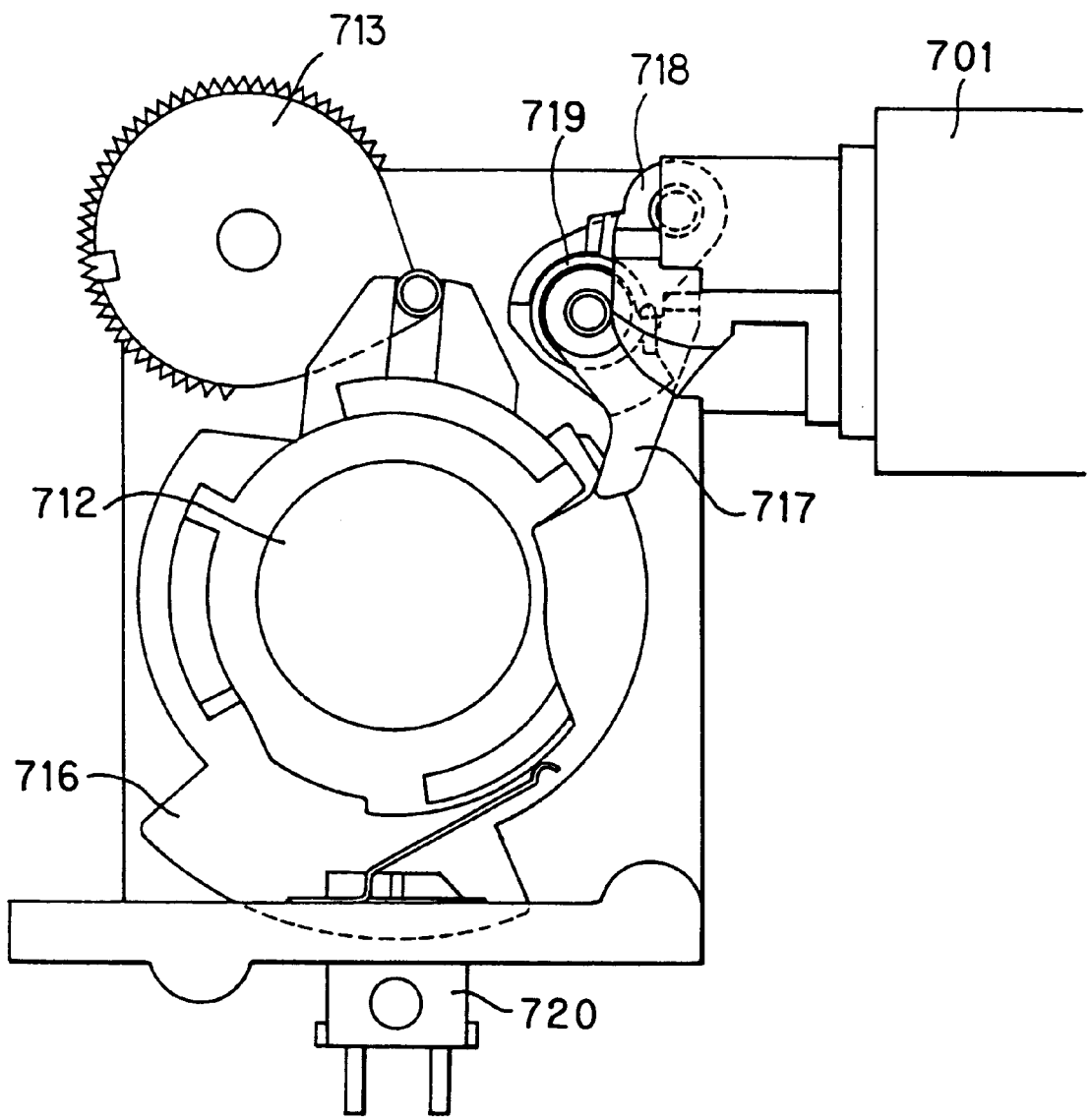
FIG. 19 is an explanatory view showing a state in which the LCD cover is rotated (closed) with an operational dial maintained in a rotated state and a state in which an operational dial is rotated when the LCD cover is closed in Embodiment 2.

FIG. 19 shows a state in which the LCD cover 701 is rotated (closed) with the operational dial 713 maintained in a rotated state or a state in which the operational dial 713 is rotated when the LCD cover 701 is closed, and the reset mechanism (levers 717, 718) is prevented from being broken by the charge spring 719 arranged in between the levers 717 and 718.

For example, when the LCD cover 701 is rotated (closed) with the operating dial 713 maintained in the rotated state shown in FIG. 19, the lens-barrel 712 can be returned to the initial position by the charge spring 719 from this state if the operating dial 713 of the manual macro is released from maintaining the rotation.

When the operating dial 713 is also rotated with the LCD cover 701 in the closed state shown in FIG. 19, the lens-barrel 712 can also be returned to the initial position by the charge spring 719 if the operating dial 713 of the manual macro is released from maintaining the rotation.

In Embodiment 2 as described above, the levers 704, 708 for opening or closing movement of the lens barrier, or the levers 717, 718 and the charge spring 719 (reset mechanism and breakage preventing mechanism) are operated by using the cam 702 or the cam 703 having an uneven form provided in the rotary shaft for opening or closing movement of the LCD cover 701. It should be noted that the cam 702 is a cam to generate displacement in a direction perpendicular to the direction of the rotary shaft, and the cam 703 is a cam to generate displacement of the rotary shaft of the LCD cover 701 in a direction parallel to the direction of the rotary shaft. Also, it is desirable that the cam 702 and cam 703 are integrated with the rotary shaft.

In Embodiment 2 as described above, opening or closing movement of the LCD cover 701 is correlated to opening or closing movement of the lens barrier 705, ON/OFF control of the main switch 711 and to resetting of various types of mechanism, so that it is possible to provide a digital camera which can reduce the number of required switches and also improve the operability, and in addition, achieve reduction in imaging mistakes.

As described above, with the digital camera according to the present invention (claim 1), in the digital camera having an upper cover functioning as a cover for the monitor and also attached to a basic body of the camera so that it can freely be opened or closed, and exposing or incorporating the monitor by opening or closing the upper cover, an upper cover state detector detects whether the upper cover has been opened or closed, a controller controls power supply to the basic body of the camera and/or to the monitor according to a result of detection by the upper cover state detector, and opening or closing movement of the upper cover is correlated to ON/OFF control of power supply source, which allows reduction of a required switch for ON/OFF control of power supply source, improvement in operability by reducing operational sequences, and elimination of useless power consumption due to user's careless mistakes such as forgetting to turn OFF the power supply source, and for this reason it is possible to provide a low power consumption digital camera.

With the digital camera according to the present invention, the upper cover state detector detects an opening or a closing angle of the upper cover, and the controller controls power supply to the basic body of the camera and/or to the monitor when a result of detection by the upper cover state detector indicates that the detected angle of the upper cover is more than or less than a specified value, which allows turning OFF of power supply to the basic body of the camera or to the monitor when the upper cover is forgot to be closed or is accidentally opened and elimination of useless power consumption, and for this reason it is possible to provide a low power consumption digital camera.

With the digital camera according to the present invention, the controller turns OFF power supply to the monitor when the upper cover is kept open for a preset period of time, which allows reduction of useless power consumption, and for this reason it is possible to provide a lower power consumption digital camera.

With the digital camera according to the present invention, the controller turns OFF power supply to the monitor when the upper cover is kept open and a self-timer switch is pressed down, which allows reduction of useless power consumption, and for this reason it is possible to provide a low power consumption digital camera.

With the digital camera according to the present invention, the switch provided in the control panel section turns ON power supply to the monitor when the controller has turned ON power supply to the basic body of the camera and has turned OFF power supply to the monitor, so that it is possible to provide a low power consumption digital camera which can control power supply to the monitor with high operability.

With the digital camera according to the present invention, the switch to turn ON power supply to the monitor is a release switch or a mode select switch, which allows improvement in operability, and for this reason it is possible to provide a practically constructed digital camera.

With the digital camera according to the present invention, the digital camera comprises an imaging device for imaging an object and outputting the image information, a monitor for displaying the image information for the imaged object or other information, and an upper cover functioning as a cover for the monitor and also attached to a basic body of the camera so that it can freely be opened or closed, and exposes or incorporates the monitor by opening or closing the upper cover, and also comprises a correlatedly opening/closing unit having a opening/closing mechanism for turning ON/OFF power supply to the basic body of the camera and monitor in correlation to opening or closing movement of the upper cover, so that it is possible to provide a digital camera which can reduce a required switch, improve operability, and reduce imaging mistakes by correlating opening or closing movement of the upper cover to ON/OFF control of power supply source.

With the digital camera according to the present invention, the digital camera comprises an imaging device for imaging an object and outputting the image information, a monitor for displaying the image information for the imaged object or other information, and an upper cover functioning as a cover for the monitor and also attached to a basic body of the camera so that it can freely be opened or closed, and exposes or incorporates the monitor by opening or closing the upper cover, and also comprises a correlatedly opening/closing unit having an opening/closing mechanism to operate opening/closing movement of a lens barrier and turning ON/OFF of power supply to the basic body of the camera as well as to the monitor in correlation to the opening or closing movement of the upper cover, so that it is possible to provide a digital camera which can reduce a required switch, improve operability, and reduce imaging mistakes by correlating opening or closing movement of the upper cover to the opening or closing movement of the lens barrier and ON/OFF control of power supply.

With the digital camera according to the present invention, the correlatedly opening/closing unit correlates opening/closing movement of the upper cover to opening/closing movement of the lens barrier and turning ON/OFF of power supply to the basic body of the camera as well as to the monitor with at least one coupling member, which allows opening or closing movement of the upper cover to be correlated to opening or closing of the lens barrier and ON/OFF control of power supply.

With the digital camera according to the present invention, the correlatedly opening/closing unit operates so that power supply to the basic body of the camera as well as to the monitor is turned ON, after the lens barrier has fully been opened, when the upper cover is opened, which allows improvement in operability as well as in convenience in use.

With the digital camera according to the present invention, the correlatedly opening/closing unit has a breakage preventing mechanism for preventing the opening/closing mechanism from being broken due to opening or closing movement of the upper cover in the state where the lens barrier is locked in the closed state or the opened state because of any abnormal operation, and when it is tried to open or close the upper cover, so that even if there occurs a state where opening or closing movement of the lens barrier can not temporarily be correlated to opening or (losing movement of the upper cover due to any abnormal operation, the means can be used as usual without being stuck when the abnormal operation is released.

With the digital camera according to the present invention, the correlatedly opening/closing unit has a reset mechanism enabling selection of an operation mode of various types of mechanism including manual macro in correlation to opening movement of the upper cover and also resetting the operation mode of the mechanism in correlation to closing movement of the upper cover, so that it is possible to provide a digital camera which can reduce the number of required switches, improvement operability, and reduce imaging mistakes by correlating opening or closing movement of the upper cover to opening or closing movement of a lens barrier, ON/OFF control of power source, and to resetting of the various types of mechanism.

With the digital camera according to the present invention, the correlatedly opening/closing unit has a breakage preventing mechanism for maintaining the operation mode of the mechanism in the initial one and also for preventing the reset mechanism from being broken by an external force due to any abnormal operation when the upper cover has been closed, which allows improvement in operability as well as in convenience in use.

With the digital camera according to the present invention, the correlatedly opening/closing unit has a breakage preventing mechanism for preventing the reset mechanism from being broken due to closing movement of the upper cover when it is tried to close the upper cover while the mechanism mode is kept locked in the state where the upper cover is opened, which allows improvement in operability as well as in convenience in use.

With the digital camera according to the present invention, the correlatedly opening/closing unit has a cam member having an uneven form and provided in a rotary shaft for opening or closing the upper cover and makes the coupling member, the reset mechanism or the breakage preventing mechanism operate using the cam member, so that operation of the coupling member, the reset mechanism and the breakage preventing mechanism can easily be controlled by adjusting a form of the cam member.

With the digital camera according to the present invention, the cam member includes a cam oriented in the vertical direction to the rotary shaft, so that the operation of the coupling member, the reset mechanism and the breakage preventing mechanism can further be controlled in various manners.

With the digital camera according to the present invention, in the correlatedly opening/closing unit, the opening/closing mechanism, reset mechanism and/or the breakage preventing mechanism are provided independently from each other, which allows the opening/closing mechanism, reset mechanism and the breakage preventing mechanism to operate regardless of each of the states respectively.

With the digital camera according to the present invention, the cam member is integrated with the rotary shaft, which allows the cam member with simple construction to be rotated without fail in correlation to rotation of the upper cover.

With the digital camera according to the present invention, the manual macro is based on a dial system and can adjust a macro distance within a preset range in a stepless and linear manner, and the reset mechanism returns manual macro adjusted in the digital system to the initial position in correlation to closing movement of the upper cover, which allows improvement in operability as well as in convenience in use when the manual macro is used.

This application is based on Japanese patent application Nos. HEI 8-257146 and HEI 9-246333 filed in the Japanese Patent Office on Sep. 27, 1996, and Sep. 11, 1997, respectively the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital camera having an image pick up device for picking up an object and outputting image information, a monitor for displaying said image information for the imaged object or other information, and an upper cover functioning as a cover for said monitor and also attached to a basic body of the camera so that it can freely be opened or closed, and exposing or incorporating said monitor by opening or closing said upper cover, said digital camera comprising:

a correlatedly opening/closing means having an opening/closing mechanism to operate opening/closing movement of a lens barrier and said upper cover, and turning ON/OFF of power supply to the basic body of the camera as well as to a monitoring correlation to the opening or closing movement of said upper cover;

wherein said correlatedly opening/closing means has a breakage preventing mechanism for preventing said opening/closing mechanism from being broken due to opening or closing movement of said upper cover in a state where said lens barrier is locked in a closed state or an opened state because of any abnormal operation, and when it is tried to open or close said upper cover.

2. A digital camera having an image pick up device for picking up an object and outputting image information, a monitor for displaying said image information for the imaged object or other information, and an upper cover functioning as a cover for said monitor and also attached to a basic body of the camera so that it can freely be opened or closed, and exposing or incorporating said monitor by opening or closing said upper cover, said digital camera comprising:

a correlatedly opening/closing means having an opening/closing mechanism to operate opening/closing movement of a lens barrier and said upper cover, and turning ON/OFF of power supply to the basic body of the camera as well as to a monitoring correlation to the opening or closing movement of said upper cover;

wherein said correlatedly opening/closing means has a reset mechanism enabling selection of an operation mode of various types of mechanism including manual macro in correlation to opening movement of said upper cover and also resetting the operation mode of said reset mechanism in correlation to closing movement of said upper cover; and wherein said correlatedly opening/closing means has a breakage preventing mechanism for maintaining said operation mode of the mechanism in an initial position and also for preventing said reset mechanism from being broken by an external force due to any abnormal operation when said upper cover has been closed.

3. A digital camera having an image pick up device for picking up an object and outputting image information, a monitor for displaying said image information for the imaged object or other information, and an upper cover functioning as a cover for said monitor and also attached to a basic body of the camera so that it can freely be opened or closed, and exposing or incorporating said monitor by opening or closing said upper cover, said digital camera comprising:

a correlatedly opening/closing means having an opening/closing mechanism to operate opening/closing movement of a lens barrier and said upper cover, and turning ON/OFF of power supply to the basic body of the camera as well as to a monitoring correlation to the opening or closing movement of said upper cover;

wherein said correlatedly opening/closing means has a reset mechanism enabling selection of an operation mode of various types of mechanism including manual macro in correlation to opening movement of said upper cover and also resetting the operation mode of said reset mechanism in correlation to closing movement of said upper cover; and wherein said correlatedly opening/closing means has a breakage preventing mechanism for preventing said reset mechanism from being broken due to closing movement of said upper cover when it is tried to close said upper cover while said reset mechanism is kept locked in a state where said upper cover is opened.

4. A digital camera having an image pick up device which picks up an object and outputs image information, a monitor which displays said image information for the imaged object or other information, and an upper cover functioning as a cover for said monitor and also attached to a basic body of the camera so that it can freely be opened or closed, and exposing or incorporating said monitor by opening or closing said upper cover, said digital camera comprising:

a correlatedly opening/closing unit having an opening/closing mechanism to operate opening/closing movement of a lens barrier and said upper cover, and turning ON/OFF of power supply to the basic body of the camera as well as to a monitoring correlation to the opening or closing movement of said upper cover;

wherein said correlatedly opening/closing unit has a breakage preventing mechanism which prevents said opening/closing mechanism from being broken due to opening or closing movement of said upper cover in a state where said lens barrier is locked in a closed state or an opened state because of any abnormal operation, and when it is tried to open or close said upper cover.

5. A digital camera having an image pick tip device which picks up an object and outputs image information, a monitor which displays said image information for the imaged object or other information, and an upper cover functioning as a cover for said monitor and also attached to a basic body of the camera so that it can freely be opened or closed, and exposing or incorporating said monitor by opening or closing said upper cover, said digital camera comprising:

a correlatedly opening/closing unit having an opening/closing mechanism to operate opening/closing movement of a lens barrier and said upper cover, and turning ON/OFF of power supply to the basic body of the camera as well as to a monitoring correlation to the opening or closing movement of said upper cover;

wherein said correlatedly opening/closing unit has a reset mechanism enabling selection of an operation mode of various types of mechanism including manual macro in correlation to opening movement of said upper cover and also resetting the operation mode of said reset mechanism in correlation to closing movement of said upper cover; and wherein said correlatedly opening/closing unit has a breakage preventing mechanism which maintains said operation mode of the mechanism in an initial position and also which prevents said reset mechanism from being broken by an external force due to any abnormal operation when said upper cover has been closed.

6. A digital camera having an image pick up device which picks up an object and outputs image information, a monitor which displays said image information for the imaged object or other information, and an upper cover functioning as a cover for said monitor and also attached to a basic body of the camera so that it can freely he opened or closed, and exposing or incorporating said monitor by opening or closing said upper cover, said digital camera comprising:

a correlatedly opening/closing unit having an opening/closing mechanism to operate opening/closing movement of a lens barrier and said upper cover, and turning ON/OFF of power supply to the basic body of the camera as well as to a monitoring correlation to the opening or closing movement of said upper cover;

wherein said correlatedly opening/closing unit has a reset mechanism enabling selection of an operation mode of various types of mechanism including manual macro in correlation to opening movement of said upper cover and also resetting the operation mode of said reset mechanism in correlation to closing movement of said upper cover; and wherein said correlatedly opening/closing unit has a breakage preventing mechanism which prevents said reset mechanism from being broken due to closing movement of said upper cover when it is tried to close said upper cover while said reset mechanism is kept locked in a state where said upper cover is opened.

* * * * *